United States Patent
Ogimura

(10) Patent No.: US 9,592,682 B2
(45) Date of Patent: Mar. 14, 2017

(54) PRINTING APPARATUS AND PRINTING CONTROL PROGRAM

(71) Applicant: SEIKO EPSON CORPORATION, Tokyo (JP)

(72) Inventor: Takafumi Ogimura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/042,033

(22) Filed: Feb. 11, 2016

(65) Prior Publication Data

US 2016/0243858 A1 Aug. 25, 2016

(30) Foreign Application Priority Data

Feb. 24, 2015 (JP) ................................. 2015-033755
Jul. 7, 2015 (JP) ................................. 2015-136460

(51) Int. Cl.
| | | |
|---|---|---|
| B41J 13/00 | (2006.01) | |
| B41J 2/21 | (2006.01) | |
| B41J 2/045 | (2006.01) | |
| B41J 11/42 | (2006.01) | |
| B41J 11/00 | (2006.01) | |

(52) U.S. Cl.
CPC ....... B41J 13/0009 (2013.01); B41J 2/04503 (2013.01); B41J 2/04556 (2013.01); B41J 2/2132 (2013.01); B41J 11/0035 (2013.01); B41J 11/42 (2013.01); B41J 13/0027 (2013.01); B41J 13/0063 (2013.01)

(58) Field of Classification Search
CPC B41J 13/0027; B41J 13/0063; B41J 2/04503; B41J 2/04556; B41J 2/2132; B41J 11/0035; B41J 11/42
See application file for complete search history.

(56) References Cited

U.S. PATENT DOCUMENTS

| 5,297,871 A * | 3/1994 | Fujioka | .................... B41J 11/42 400/568 |
| 8,562,108 B2 * | 10/2013 | Langevin | ................ B41J 2/2132 347/12 |
| 2006/0044380 A1 * | 3/2006 | Yazawa | .................... B41J 11/42 347/104 |
| 2007/0057996 A1 * | 3/2007 | Yazawa | .................. B41J 2/2132 347/43 |

(Continued)

FOREIGN PATENT DOCUMENTS

JP 2007-216480 8/2007

Primary Examiner — Julian Huffman
(74) Attorney, Agent, or Firm — Workman Nydegger

(57) ABSTRACT

When printing is performed on a medium, a computer of a printing apparatus acquires a space (a PLG level number and a thickness of the medium) between a surface of the medium and a print head, which is formed when an ink is discharged onto a medium from the print head in a printing unit. A high speed/low speed of a carriage speed (print speed mode), print color (monochrome/color), and a transport region (normal region/lower end region) as a transport position of the medium are determined. A calculation expression is selected according to the carriage speed, the print color, and the transport region, and a correction amount according to a gap length is calculated using the selected calculation expression. Also, the transport distance is corrected using the correction amount. Transport control is performed by the transport distance.

8 Claims, 13 Drawing Sheets

(56) References Cited

U.S. PATENT DOCUMENTS

| | | | |
|---|---|---|---|
| 2007/0064084 A1* | 3/2007 | Kikuchi | B41J 2/32 347/221 |
| 2007/0182770 A1* | 8/2007 | Yoshida | B41J 25/308 347/6 |
| 2009/0237436 A1* | 9/2009 | Sugahara | B41J 2/04556 347/14 |
| 2012/0163892 A1* | 6/2012 | Katahira | B41J 11/42 400/76 |
| 2013/0300795 A1* | 11/2013 | Ogasawara | B41J 25/3082 347/16 |
| 2014/0285546 A1* | 9/2014 | Furuta | B41J 2/04503 347/9 |
| 2015/0224768 A1* | 8/2015 | Suzuki | B41J 2/2132 347/9 |

* cited by examiner

UPPER END REGION

CENTRAL REGION

LOWER END REGION

| PLG LEVEL NUMBER | GAP LENGTH Lpg [0.01 mm] |
|---|---|
| PLG1 | 130 |
| PLG2 | 165 |
| PLG3 | 190 |
| PLG4 | 230 |
| PLG5 | 255 |
| PLG6 | 335 |
| PLG7 | 425 |

TD2

PRINTING APPARATUS AND PRINTING CONTROL PROGRAM

BACKGROUND

1. Technical Field

The present invention relates to a printing apparatus such as an ink jet type printer and a printing control program that is executed in the apparatus.

2. Related Art

In the related art, as a type of printing apparatus, there has been known an ink jet type printer in which an ink as an example of a liquid is ejected to a medium transported in a predetermined direction from a print head moving in a direction orthogonal to a transport direction of the medium such that printing is performed. In such a printer, since the ink discharged from the print head has inertia in a moving direction of the print head, a landing position of the ink on a medium is subjected to a slight positional shift in the moving direction of the print head. In addition, when a space between a surface of the medium and the print head is changed, such a positional shift is changed depending on the degree of the change. Therefore, there is proposed a printing apparatus which controls discharge timing of discharging an ink on a medium from a moving print head, so as to suppress the positional shift in such a case, depending on a difference in the space between the surface of the medium and the print head (for example, see JP-A-2007-216480).

Incidentally, a positional shift of the landing position of the ink, which occurs when the print head discharges an ink while moving, is found in a transport direction of the medium, which intersects with the moving direction of the print head. For example, since a movement of the print head results in pushing the air in the moving direction so as to stir up a wind, the wind influences the landing position of the ink discharged from the print head so as to be subjected to the positional shift in a direction parallel to the transport direction of the medium. This type of positional shift occurs as a relative positional shift between an ink dot formed of ink, which lands by being discharged during a previous movement of the print head, and an ink dot formed of ink, which lands by being discharged during a current movement of the print head. In order for print quality not to be degraded, it is desirable to also suppress the relative positional shift between the dots, due to such a positional shift in the transport direction.

However, in this respect, JP-A-2007-216480 discloses technology of suppressing the positional shift occurring in the moving direction of the print head, through control of the discharge timing, but does not disclose any technology of suppressing the positional shift of the landing position of the ink in the transport direction of the medium. In addition, although the positional shift of the landing position of the ink in the transport direction is allowed, technology, in which degradation of print quality due to the positional shift is suppressed, has not been disclosed.

SUMMARY

An advantage of some aspects of the invention is to provide a printing apparatus, in which degradation of print quality due to a positional shift of a landing position of a liquid in a transport direction of a medium can be suppressed, and a printing control program which is executed in the printing apparatus.

Hereinafter, means of the invention and operation effects thereof will be described.

According to an aspect of the invention, there is provided a printing apparatus including: a transport unit that transports a medium; a printing unit that discharges a liquid onto the medium from a print head while the print head moves in a direction intersecting with a transport direction of the medium and performs printing; a corrector that corrects a transport distance of the medium using a correction amount obtained on the basis of the size of a space between a surface of the medium and the print head in the printing unit; and a control unit that controls the transport unit and causes the medium to be transported by the transport distance obtained after the correction.

In this case, when the liquid is discharged from the print head onto the medium transported to the printing unit by the transport unit and the printing is performed, the transport distance is corrected using the correction amount obtained on the basis of the space between the surface of the medium and the print head in the printing unit, for transporting the medium after the discharge of the liquid, which is performed with the print head moving, is finished. Also, the medium is transported by the corrected transport distance. Incidentally, when the liquid flows in a direction parallel to the transport direction during a flight through the space until the liquid lands, a shift distance of a landing position of the liquid discharged from the print head is increased to the extent of being equal to the size of the space under a condition of the same wind intensity. Although the landing position of the liquid is shifted in the transport direction in this manner, the medium is transported by the corrected transport distance which is corrected using the correction amount obtained on the basis of the size of the space. As a result, it is possible to reduce a relative positional shift of the landing liquid (print dot), which occurs in the transport direction between a printing result (print dot group) obtained when the print head moves at a previous time and a printing result (print dot group) obtained when the print head moves at a current time, before and after the medium is transported by the corrected transport distance. Hence, it is possible to suppress degradation of print quality due to this type of positional shift. For example, it is possible to reduce banding due to an overlap or a gap between the printing result by the previous time movement of the print head and the printing result by the current time movement thereof.

In the printing apparatus, it is preferable that the corrector includes a space acquiring unit that acquires the size of a space between a surface of the medium and the print head in the printing unit, and a correction amount acquiring unit that corrects the transport distance of the medium using the correction amount obtained on the basis of the size of the space.

In this case, the size of the space between the surface of the medium and the print head in the printing unit is acquired and the transport distance of the medium is corrected using the correction amount obtained on the basis of the acquired size of the space. Hence, although the liquid discharged from the print head flows in the transport direction and the landing position is shifted in the transport direction, it is possible to suppress degradation of print quality due to the positional shift in the transport direction.

It is preferable that the printing apparatus further includes a storage unit that stores reference data in which first gap lengths, as sizes of a space between a support that supports the medium and the print head, and thicknesses of a medium are individually associated with respective items of medium information. It is preferable that the space acquiring unit acquires medium information, acquires the first gap length and the thickness of the medium corresponding to the medium information with reference to the reference data on the basis of the medium information, and acquires a second gap length as the size of the space between the surface of the medium and the print head by subtracting the thickness of the medium from the first gap length.

In this case, the first gap length and the thickness of the medium corresponding to the medium information are acquired with reference to the reference data on the basis of the acquired medium information and the second gap length is acquired as the size of the space between the medium and the print head by subtracting the thickness of the medium from the first gap length. Hence, it is possible to acquire the size (second gap length) of the space on the basis of the medium information obtained at the time of the printing. Also, the control unit can cause the medium to be transported by the transport distance corrected using the correction amount obtained on the basis of the size of the space.

It is preferable that the printing apparatus further includes a storage unit that stores first reference data, in which first gap lengths, as sizes of a space between a support that is able to support the medium and the print head, are individually associated with a plurality of respective items of medium information, and second reference data containing a plurality of sets of set data in which the first gap lengths are individually associated with the correction amounts. It is preferable that the corrector acquires one first gap length according to the acquired medium information with reference to the first reference data on the basis of the acquired medium information, acquires, from the second reference data, two sets of set data containing two different first gap lengths having two values, between which a value of the first gap length is interposed, and correction amounts corresponding to the two different first gap lengths, and acquires the correction amount corresponding to the one first gap length by performing interpolation using the two sets of set data.

In this case, the corrector acquires the first gap length according to the acquired medium information with reference to the first reference data on the basis of the acquired medium information, acquires, from the second reference data, the two sets of set data containing the two different first gap lengths having the two values, between which the value of the first gap length is interposed, and the correction amounts corresponding to the two different first gap lengths, and acquires the correction amount corresponding to the one first gap length by performing interpolation using the two sets of set data. Hence, it is possible to reduce the number of items of set data which is stored in the storage unit and to relatively simply acquire the correction amount corresponding to a first gap length different from the first gap length contained in the set data.

In the printing apparatus, it is preferable that the corrector corrects the transport distance using the correction amount when the control unit performs printing corresponding to band printing.

In this case, when the printing corresponding to the band printing is performed, a large distance of transport (large feeding) of the medium is -performed by the transport distance as a length (for example, a nozzle row length) of a range in which a plurality of nozzles, which are used, are arranged in the transport direction of the medium in the print head, or as a length which is shorter than but approximate to the nozzle row length. When the printing corresponding to the band printing is performed, in which the large feeding of the medium is performed in this manner, the medium is transported by the transport distance corrected using the correction amount obtained on the basis of the space. Therefore, it is possible to reduce banding due to an overlap or a gap between the printing results before and after the large feeding of the medium is performed.

In the printing apparatus, it is preferable that the corrector performs correction in which the above correction amount is more increased when a moving speed of the print head is a first moving speed, than when the print head moves at a second moving speed that is slower than the first moving speed.

In this case, an air current (wind) generated when the moving speed of the print head is the first moving speed is likely to be stronger than that when the moving speed is the second moving speed that is slower than the first moving speed and a liquid droplet discharged from the print head is more likely to flow in the transport direction by the air current. A shift distance, by which a landing position of the liquid droplet is shifted in the transport direction by the flow through the current, is determined depending on the strength of an air current, that is, the moving speed of the print head and, thus, the higher the moving speed of the print head, the more a liquid droplet is likely to flow in the transport direction. However, when the moving speed of the print head is the first moving speed, the transport distance is corrected using the correction amount that is greater than the correction amount obtained on the basis of the second moving speed that is slower than the first moving speed. Therefore, it is possible to reduce banding due to a relative shift between the printing result obtained at a previous time and the printing result obtained at a current time.

In the printing apparatus, it is preferable that the corrector performs correction in which a correction amount, which is used when the size of the space is a first value, is smaller than a correction amount, which is used when the size is a second value which indicates that the space is wider than that having the first value.

In this case, the correction amount, which is used when the size of the space is the first value, is smaller than the correction amount used when the size is the second value which indicates that the space is wider than that having the first value. Hence, it is possible to reduce the shift of the landing position of the liquid in the transport direction both when the space between the print head and the medium has the first value and when the space therebetween has the second value.

In the printing apparatus, it is preferable that the print head is able to discharge liquid droplets having different weights, and the corrector performs correction in which a correction amount, which is used when a liquid droplet having a first weight is discharged, is smaller than a correction amount, which is used when a liquid droplet having a second weight that is less than the first weight, is discharged.

In this case, the correction amount, which is used when the liquid droplet having the first weight is discharged, is smaller than the correction amount used when the liquid droplet having the second weight that is less than the first weight.

Hence, since the transport distance is corrected by an appropriate correction amount obtained on the basis of a weight of the discharged liquid droplet, even in the same space, it is possible to more appropriately reduce the shift of the landing position of the liquid in the transport direction, regardless of a difference in the weight of the discharged liquid droplet.

In the printing apparatus, it is preferable that printing modes includes a monochrome printing mode and a color printing mode, and the corrector changes the correction amount depending on the monochrome printing mode and the color printing mode.

In this case, in the monochrome printing mode and the color printing mode, the specific gravity of the liquid droplet is different, for example, depending on a difference in pigments or a difference in dye, in a liquid droplet. The difference in the specific gravity of the liquid droplet influences the shift distance of the landing position in the transport direction when the liquid droplet flows through the air current. However, the correction amount is changed depending on the color printing mode and the monochrome printing mode. Hence, the transport distance is corrected using a different correction amount depending on each of the monochrome printing mode and the color printing mode although the space is the same and, thus, it is also possible to more appropriately reduce the shift of the landing position of the liquid in the transport direction, in both the monochrome printing mode and the color printing mode.

In the printing apparatus, it is preferable that the corrector performs correction in which a correction amount, which is used when a liquid discharge amount ratio representing the ratio of an actual total discharge amount to the maximum total discharge amount, by which the print head is able to perform the discharge through moving once, is a first ratio, is smaller than a correction amount, which is used when the ratio is a second ratio that is greater than the first ratio.

In this case, the correction amount, which is used when the liquid discharge amount ratio representing the ratio of the actual total discharge amount to the maximum total discharge amount by which the print head is able to perform the discharge through moving once is a first ratio, is smaller than the correction amount used when the ratio is the second ratio that is greater than the first ratio. Incidentally, the greater the liquid discharge amount ratio, the higher a force in a direction, in which the discharged liquid droplets are separated from each other, is generated and, thus, the landing position of the liquid is shifted in the transport direction. However, since the medium is transported by the transport distance corrected using the correction amount obtained on the basis of the liquid discharge amount ratio, degradation of print quality due to a positional shift of the landing position of the liquid droplet in the transport direction is suppressed.

According to another aspect of the invention, there is provided a printing control program that causes a computer in a printing apparatus to perform acquiring the size of a space between a surface of a medium and a print head in a printing unit, correcting a transport distance of the medium using a correction amount obtained on the basis of the size of the space, and controlling a transport unit such that the medium is transported by the corrected transport distance. The printing apparatus includes: the transport unit that transports the medium in a transport direction; the printing unit that discharges a liquid onto the medium from the print head and performs printing while moving in a direction intersecting with the transport direction of the medium; and a control unit that controls the transport unit and the printing unit. In this case, it is possible to achieve the same operational effects as those in the printing apparatus described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of a printing apparatus will be described with reference to the drawings.

Figure 1:
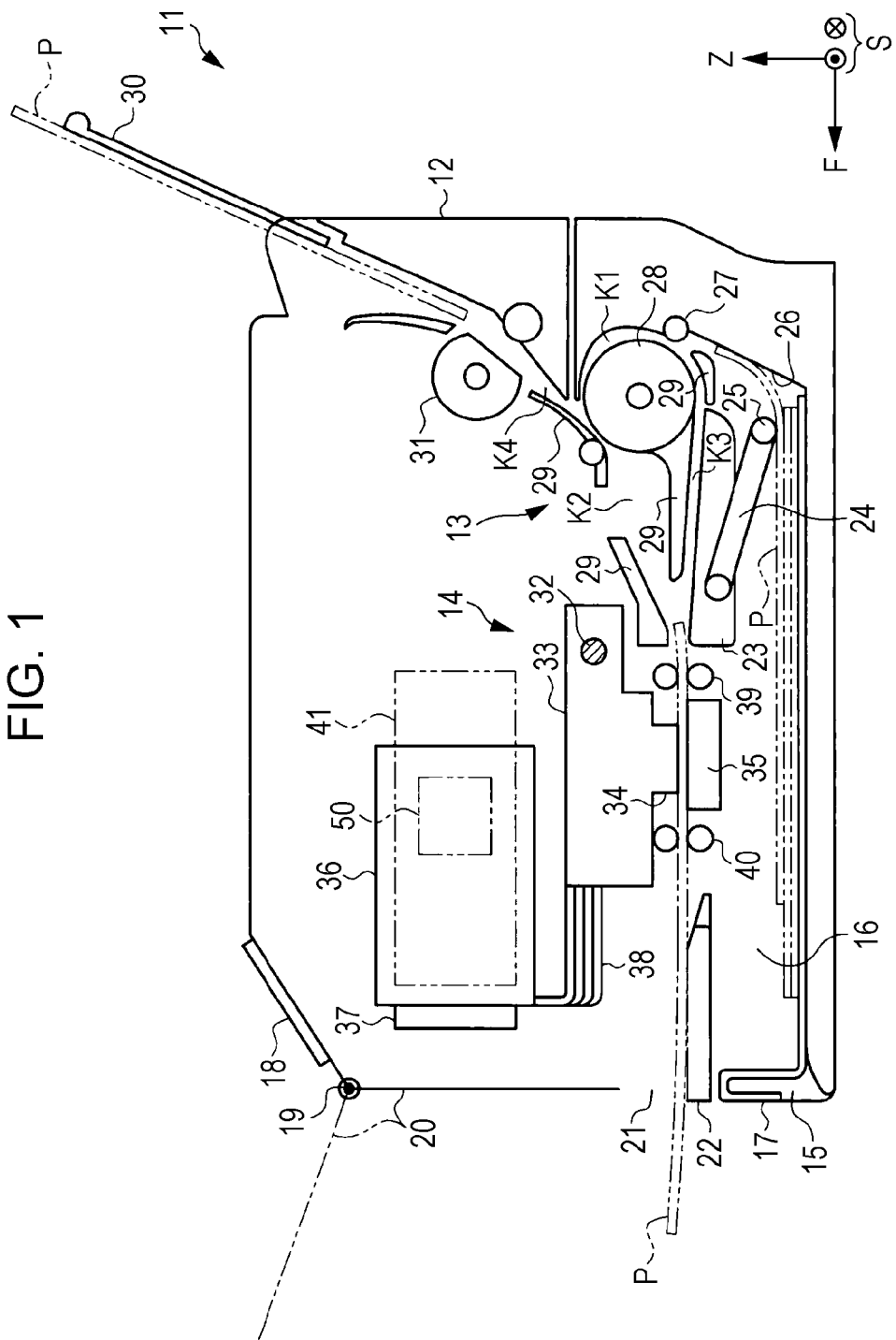
FIG. 1 is a schematic sectional side view illustrating an outline structure of a printing apparatus.

As illustrated in FIG. 1, a printing apparatus 11 includes a substantially box-shaped housing 12 in which a transport unit 13 that transports a medium P such as a sheet of paper along a transport path, and a printing unit 14 that discharges an ink onto the medium P transported by the transport unit 13 and performs printing, are provided. In addition, in a cassette accommodating section 16 provided to be recessed with a rectangular opening 15 on a front surface of the housing 12 in the lower portion in the housing 12, a cassette 17, in which a plurality of sheets of media P to be fed one by one to the printing unit 14 can be contained, is inserted and attached in a detachable state through the opening 15 on the front surface side.

In addition, an operation unit 18 configured of a liquid crystal panel or the like, which is used when a user inputs or visually recognizes information about printing to the printing apparatus 11, is provided in the upper portion on the front surface of the housing 12. Also, a hinge pin 19 extending in a horizontal direction is provided at a position on the front surface of the housing 12, which is lower than the operation unit 18, and a front cover 20, which configures a part of the front surface of the housing 12, is supported by the hinge pin 19 so as to be opened and closed between a closed position represented by a solid line and an opened position represented by a two-dot chain line in FIG. 1.

In addition, a delivery port 21, through which the medium P, on which an image or the like is printed in the printing unit 14, can be delivered outside the housing 12, is provided between the lower end of the front cover 20 and the opening 15 of the cassette accommodating section 16 on the front surface of the housing 12. Also, a delivery base 22, which can support, from below, the medium P delivered from the delivery port 21, is disposed under the delivery port 21 so as to slide toward the front in a delivery direction.

In addition, a plate-like transport path configuring member 23 having a top surface, which can configure a part of the transport path of the medium P, is provided at a position in an upper portion deep inside the cassette accommodating section 16 at a height substantially the same as that of the delivery base 22.

A lever member 24 is turnably supported by the transport path configuring member 23 and a feeding roller 25 is rotatably supported at the lower end of the lever member 24. The feeding roller 25 can rotate in a state of being in contact with the top surface of the medium P of the uppermost layer among the plurality of sheets of media P mounted in the cassette 17 in a stacked state, and the feeding roller rotates based on a driving force transmitted from a feeding motor (not illustrated), thereby sending the medium P from the inside of the cassette 17 toward an inclined separation surface 26 provided deepest in the cassette accommodating section 16. In a case where the media P are send out in a stacked state by the feeding roller 25 from the cassette 17, the inclined separation surface 26 separates and guides the media P one by one upward in inclination to the rearward side.

As illustrated in FIG. 1, a retard roller 27 is disposed in the upper end portion of the inclined separation surface 26 so as to rotate about its axis in a rightward-leftward direction and a reverse roller 28 having a large diameter, which can be driven in rotation with the medium P interposed with the retard roller 27, is disposed at an upward position in inclination to the frontward side from the retard roller 27. In addition, a plurality of transport path configuring members 29 other than the transport path configuring member 23 described above, are provided on the periphery of the reverse roller 28 in the housing 12 so as to form the transport path of the medium P with the reverse roller 28 and the transport path with the transport path configuring member 23 described above.

Also, in the housing 12, a reverse route K1, through which the medium P sent upward in inclination to the rearward side after passing between the retard roller 27 and the reverse roller 28 from the inclined separation surface 26 is received and is caused to be reversed, and a printing route K2, through which the medium P received from the downstream end of the reverse route K1 is transported to the printing unit 14, are formed by the transport path configuring members 23 and 29 and the reverse roller 28.

In addition, in order to perform duplex printing on the medium P, on one surface of which printing has been performed in the printing unit 14, a returning route K3, through which the medium can return and be transported to the upstream end of the reverse route K1 through another route separated from the printing route K2, is formed between the transport path configuring members 23 and 29 adjacent in a vertical direction (direction parallel to a Z direction in FIG. 1).

The transport unit 13 transports the medium P fed to the printing unit 14 through the reverse route K1, the printing route K2, and the returning route K3 in a transport direction F intersecting with (particularly, orthogonal to) a scanning direction S.

A mounting tray 30, on which the medium P can be mounted, is provided in the upper end portion in the rearward portion of the housing 12 so as to extend upward in inclination to the rearward side. A route continuous downward in inclination to the frontward side from the lower end of the mounting tray 30 is a joining route K4 with respect to the printing route K2 and the joining route K4 is joined to the printing route K2 at a position slightly on the downstream side from a boundary position between the printing route K2 and the reverse route K1. Additionally, a sending roller 31 having a D shape in a sectional plane, which rotates when the medium P mounted on the mounting tray 30 is sent to the joining route K4 and is supplied to the printing route K2, is supported at a boundary position between the joining route K4 and the mounting tray 30.

Figure 6:
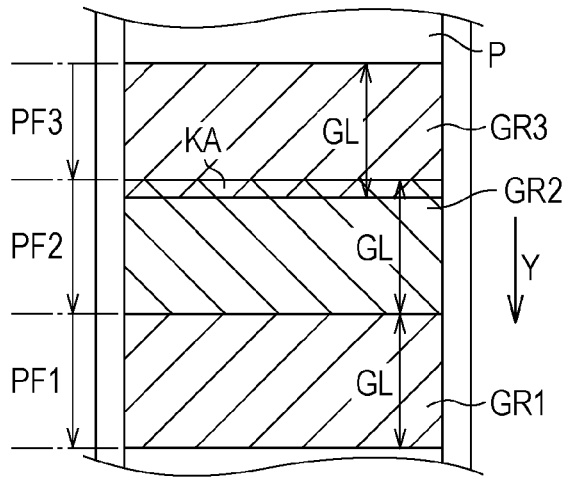
FIG. 6 is a schematic plan view illustrating an example in which black banding appears on a printing result printed in the normal band printing method.

In addition, as illustrated in FIG. 1, in the housing 12, a guide shaft 32 is provided in the printing unit 14 to which the medium P is transported from the printing route K2 of the transport unit 13 so as to extend in the scanning direction S intersecting with (particularly, orthogonal to) the transport direction F of the medium P. A carriage 33 is movably supported on the guide shaft 32 in the scanning direction S along the guide shaft 32, and a print head 34 that can discharge an ink is supported under the carriage 33. Further, as illustrated in FIG. 6, a nozzle row formed of multiple nozzles 34N is formed in the transport direction F of the medium P on a nozzle formed surface 34a which is the underside surface of the print head 34.

In addition, in the housing 12, a support base 35 that can support the medium P transported to the printing unit 14 is provided at a position which vertically faces the print head 34 (specifically, the nozzle formed surface 34a) so as to extend in a direction parallel to the scanning direction S. Also, the ink is discharged to the medium P, which is transported to the printing unit 14 and of which the back surface is supported on the support base 35, from the respective nozzles 34N of the nozzle formed surface 34a while the print head 34 moves in the scanning direction S, and thereby an image or the like is printed on the surface of the medium P.

A frame-like holder 36 is provided at a position on the back surface side of the front cover 20 in the upper front portion in the housing 12 and a plurality of (four in the present embodiment) ink cartridges 37, in which different color inks are contained, respectively, are attached in the holder 36. In other words, in the present embodiment, the plurality of (for example, four) ink cartridges 37, in which four color inks of black, cyan, magenta, and yellow are individually contained, are detachably attached to the holder 36, with the front cover 20 at an opened position. Also, the respective color inks are supplied to the print head 34 through individual supply tubes 38 from the respective ink cartridges 37.

In addition, as illustrated in FIG. 1, in the transport path of the medium P from the printing route K2 through the support base 35 to the delivery port 21 in the housing 12, a first transport roller pair 39 is arranged on the upstream side from the printing unit 14 (specifically, the support base 35) and a second transport roller pair 40 is arranged on the downstream side from the printing unit 14. The transport roller pair 39 and the transport roller pair 40 can transport the medium P in the transport direction F in a state in which the rollers on the upper and lower sides as pairs, respectively, rotate with the medium P interposed, by both front and back sides, between the rollers.

Additionally, a substrate unit 41 is disposed at a position adjacent to the holder 36 in the housing 12 and a controller 45 is configured to have the substrate unit 41. A computer 50 configured to have a one-chip microcomputer or the like is installed in the substrate unit 41. The computer 50 controls operations of the transport unit 13 or the printing unit 14 in the printing apparatus 11, based on information input from an external source outside the printing apparatus 11 through a communication line or information input from an operation unit 18 of the printing apparatus 11.

Next, a control configuration in the printing apparatus 11 will be described.

Figure 2:
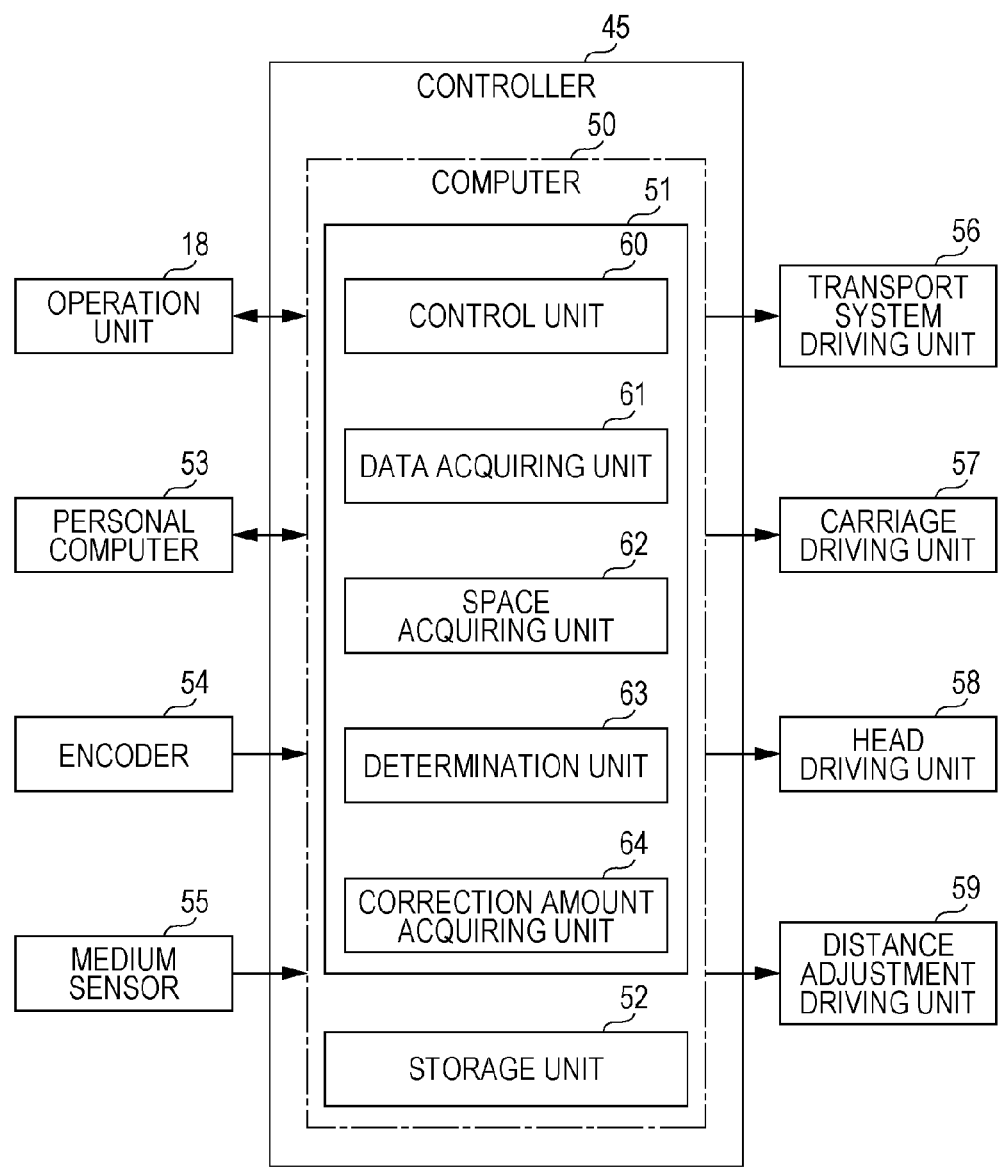
FIG. 2 is a block diagram illustrating a control configuration of the printing apparatus.

As illustrated in FIG. 2, the computer 50 in the printing apparatus 11 is configured to have a CPU 51, as the central processing unit, having a logical operation function, and a digital computer including a storage unit 52 configured to have a ROM which stores predetermined information in a readable manner and a RAM which stores various items of information in a writable and readable manner.

In a case where various items of information are input through an interface (not illustrated), the computer 50 performs various types of logical operations required so as to control a processing procedure such as the transport of the medium P by the printing apparatus 11 or the printing on the medium P, and performs reading and writing of various items of information used in the logical operations. In addition, various types of programs used so as to control an operating state of the printing apparatus 11 are stored in the storage unit 52.

Further, the various types of programs, which are stored in the storage unit 52, include a printing control program which is executed by the computer 50 when a transport distance is controlled based on the size of a space between the surface of the medium P and the print head 34 at the time of the printing, when the transport unit 13 transports the medium P. Incidentally, the printing control program is stored in a storage medium such as a memory card which can be inserted in a card insertion slot (not illustrated) provided in the printing apparatus 11 and the printing control program may be read from the storage medium, as necessary, or may be downloaded from a server via Internet or the like, as necessary.

In addition, as illustrated in FIG. 2, the operation unit 18 provided in the printing apparatus 11 is connected to the computer 50 in a state of being able to input information based on an operation of the operation unit and a personal computer (PC) 53 which, for example, as an external terminal, belongs to a user, is connected to the computer in a communicating manner through a communication line. The PC 53 transmits printing information to the computer 50, thereby enabling a predetermined image or the like to be printed on the medium P by the printing unit 14 on the basis of control by the computer 50. In addition, at the time of the printing, the PC 53 can receive, from the computer 50, information or the like which indicates that the printing is currently performed.

In addition, an encoder 54 and a medium sensor 55 are connected to the computer 50 so as to be able to input a detection signal detected by various sensors. The encoder 54 is, for example, a rotary encoder that detects a rotation amount of the rollers (for example, rollers of the first transport roller pair 39) which come into contact with the medium P and rotate when the medium P is transported to the printing unit 14 and an input shaft of the encoder is linked to a rotating shaft of the roller so as to be able to integrally rotate. The medium sensor 55 detects the medium P at a position in the nearest position from the printing unit 14 on the upstream side in the transport direction F and detection states (ON/OFF) of the medium sensor are switched when an end portion (leading end or trailing end) of the medium P in the transport direction F is detected. For example, the medium sensor is configured to have a photosensor or the like disposed at a position as a detection position between the first transport roller pair 39 and the support base 35.

In addition, as illustrated in FIG. 2, a plurality of driving units 56 to 59, which are driven in the printing apparatus 11, are connected to the computer 50. In other words, the transport system driving unit 56 such as an electric motor, which drives the transport unit 13, the carriage driving unit 57 such as the electric motor, which drives the carriage 33, the head driving unit 58 which drives the print head 34 at the time of the printing, and the space adjustment driving unit 59 such as the electric motor, which is driven at the time of adjustment of the size of the space between the print head 34 and the support base 35, are connected to the computer 50.

The transport system driving unit 56 causes the respective rollers (for example, driving rollers of the transport roller pairs 39 and 40) which configure the transport unit 13 or causes the rotation thereof to be stopped, through control of a rotation state of the transport system driving unit by the computer 50. In addition, the carriage driving unit 57 causes the carriage 33, which is linked to be driven thereto through a pulley or an endless belt, to move along the guide shaft 32 intersecting with (particularly, orthogonal to) the transport direction F of the medium P, or causes the movement to be stopped, through control of a rotation state of the carriage driving unit by the computer 50. In addition, the head driving unit 58 applies a voltage to a piezoelectric element or the like which is driven when the print head 34 discharges the ink or stops the applying of the voltage, on the basis of the control by the computer 50.

Additionally, the computer 50 controls the rotation state of the space adjustment driving unit such that the space adjustment driving unit 59 causes, for example, a bearing member (not illustrated) of the guide shaft 32, which is linked to be driven through a rack-and-pinion mechanism, to move in a vertical direction, or causes the movement to be stopped. In other words, when the electric motor of the space adjustment driving unit 59 is rotated and driven, a force of the rotation is converted into a force of movement in the vertical direction by the rack-and-pinion mechanism and the bearing member of the guide shaft 32 also moves in the vertical direction by the moving force in the vertical direction. Therefore, both the carriage 33 supported by the guide shaft 32 and the print head 34 supported by the carriage 33 move in the vertical direction. Further, as long as both the surface of the medium P supported on the support base 35 and the print head 34 move relatively in a direction in which both face each other and the space between both is changed in a direction in which the print head 34 is caused to move by the space adjustment driving unit 59, the direction is not limited to the vertical direction.

The control of the space adjustment driving unit 59 enables a first gap length Lpg as the size of a space PLG (hereinafter, also referred to as a "first space PLG") between the print head 34 and the support base 35 and a second gap length x as the size of a space PAG (hereinafter, also referred to as a "second space PAG") between the medium P supported on the support base 35 and the print head 34, to be adjusted. Also, in a case where the space PLG (or PAG) is adjusted by the space adjustment driving unit 59, a value of the space PLG (or PAG) is temporarily stored in the storage unit 52. Further, a value of the second gap length x as the size of the second space PAG is smaller than that of the first gap length Lpg as the size of the first space PLG, by an amount corresponding to a thickness LP of the medium P.

The CPU 51 in the computer 50 in the present embodiment has a plurality of functional units that perform various types of processes through communication of data between the PC 53 and the operation unit 18. In other words, the CPU 51 includes a control unit 60, a data acquiring unit 61, a space acquiring unit 62, a determination unit 63, and a correction amount acquiring unit 64, as functional units for performing correction of a transport distance of the medium P by the transport unit 13 based on the space PAG between a surface Pa of the medium P and the print head 34, at the time of printing. Further, in the present embodiment, an example of a corrector is configured to have the space acquiring unit 62, the determination unit 63, and the correction amount acquiring unit 64.

The control unit 60 controls the printing apparatus 11 overall and controls driving of the transport system driving unit 56, the carriage driving unit 57, the head driving unit 58, and the space adjustment driving unit 59. The control unit 60 controls the transport distance of the medium P through the control of driving of the transport system driving unit 56. In addition, the control unit 60 controls the driving of the carriage driving unit 57, thereby controlling a moving speed of the print head 34 mounted in the carriage 33, in the scanning direction S. Further, control unit 60 controls the driving of the head driving unit 58 based on print data at the time of scanning of the carriage 33, thereby causing an ink droplet to be discharged from the nozzles 34N of the print head 34. With a dot formed by landing of the discharged ink droplet on the surface Pa of the medium P, printing of a document, an image, or the like, is performed on the medium P, based on the print data. In addition, the control unit 60 controls the driving of the space adjustment driving unit 59, thereby controlling the size (first gap length Lpg) of the space PLG between the print head 34 and the support base 35. In the present example, the space adjustment driving unit 59 is driven, thereby causing a plurality of levels of sizes of the first space PLG to be adjusted. The control unit 60 regulates the plurality of levels of the space PLG in the PLG level numbers. The PLG level numbers include seven levels of PLG 1 to PLG 7, as an example. As the level number of the space PLG is increased, the first gap length Lpg is increased level by level.

The data acquiring unit 61 acquires data such as print information (print condition information) input from the operation unit 18 or print information (print condition information) input from the PC 53 and the acquired data is stored in the storage unit 52, as necessary. Further, the print information contains, in addition to image information representing an image which is printed on the medium P, printing mode information representing print quality (standard and high definition) or print color (monochrome and color), differentiation information representing differentiation between single-side printing and duplex printing as a printing method, and medium information in relation to a type (medium type) of medium P and the thickness LP. In addition, the data acquiring unit 61 temporarily stores, in the storage unit 52, detection information of a number of pulses proportional to the transport distance of the medium P, which is input from the encoder 54 at the time of printing, and detection information of the medium P detected at the detection position by the medium sensor 55.

The space acquiring unit 62 acquires the space PAG between the print head 34 and the surface Pa of the medium P. The space PAG is also referred to as a paper gap in a case where the medium P is a sheet of paper. The space acquiring unit 62 acquires the PLG level number and the thickness LP of the medium P which define the first gap length Lpg based on the medium information contained in the print information. Also, the space acquiring unit 62 acquires the first gap length Lpg according to the PLG level number. Additionally, the space acquiring unit 62 acquires the second gap length x as the size of the space PAG between the print head 34 and the surface Pa of the medium P on the support base 35 by subtracting the thickness LP of the medium P from the first gap length Lpg. Further, in some cases, the space acquiring unit is acquire the second gap length x as a difference between both the first gap length and the thickness, but may acquires just the first gap length Lpg and the thickness LP of the medium P, as information required to acquire the second gap length x.

Figure 3:
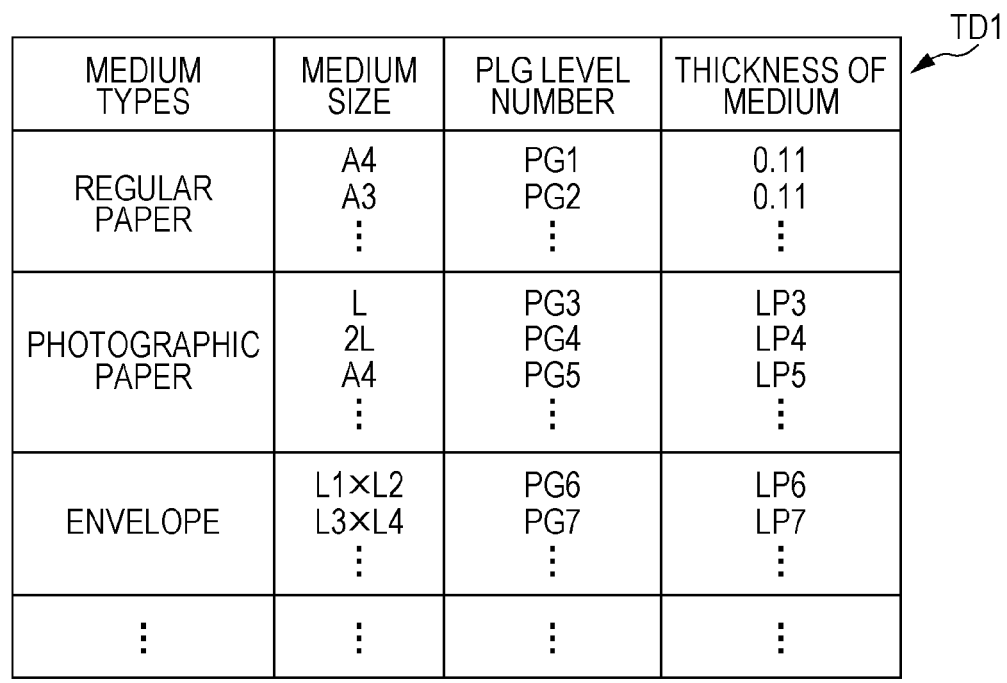
FIG. 3 is a diagram illustrating a PLG table showing a corresponding relationship between medium information, PLG level number, and the thickness of a medium.

In the storage unit 52, PLG table data TD1 illustrated in FIG. 3 is stored. In the PLG table data TD1, the PLG level numbers are associated with the thicknesses LP of the medium P, for each combination of the medium types and medium sizes. The space acquiring unit 62 acquires the PLG level number and the thickness LP of the medium P, which correspond to the medium type and the medium size at that time, with reference to the PLG table data TD1 illustrated in FIG. 3 on the bases of the medium type and the medium size. Also, the space acquiring unit 62 acquires the second gap length x by subtracting the acquired thickness LP of the medium P from the first gap length Lpg corresponding to the acquired PLG level number, in a case where the second gap length x needs to be acquired. Further, as illustrated in FIG. 3, medium types as targets, on which the printing apparatus 11 of the present embodiment performs printing, include "regular paper", "photographic paper", "envelope", or the like, and the medium sizes include "A4", "A3", L, 2L, standard envelope sizes (for example, L1×L2, L1×L2, and the like), and the like. As the thicknesses LP of the medium, the regular paper is set to, for example, "0.11 mm", the photographic paper is set to "LP3", "LP4", "LP5", and the like, and the envelope is set to "LP6", "LP7", and the like.

The determination unit 63 acquires various items of information required to correct the transport distance from various items of information acquired by the data acquiring unit 61 and performs various types of determination based on the various items of acquired information. The determination unit 63 performs determination of whether a speed of the carriage, as the moving speed of the print head 34 at the time of printing, is high or low, determination of whether the print color is monochrome or color, determination of whether the medium P is positioned in a normal region or in a lower end region during the printing, determination of whether the print method is the single-side printing or the duplex printing, determination of whether the print quality is the standard or the high definition, or the like.

Of two types of correction amounts ΔPF1 and ΔPF2 which are used in correction of the transport distance PF, the correction amount acquiring unit 64 acquires the latter correction amount ΔPF2 which is used to reduce a positional shift by which the landing position of the ink droplet is shifted in the transport direction F due to an influence of wind. The correction amount acquiring unit 64 of the present example acquires the correction amount ΔPF2 through calculation using a predetermined calculation expression on the basis of the second gap length x. In other words, the correction amount acquiring unit 64 selects one calculation expression according to a determination result of the determination unit 63 and computes, using the calculation expression, the correction amount ΔPF2 according to the second gap length x which is defined by the first gap length Lpg and the thickness LP of the medium P, which are acquired by the space acquiring unit 62 on the basis of the medium information. The correction amount ΔPF2 is represented by a function f(x) of the second gap length x acquired by subtracting the thickness LP of the medium P from the first gap length Lpg according to the PLG level number determined from the medium information at that time.

The function f(x) needs to be individually set for each printing apparatus 11. However, there are a plurality of parameters which determine the influence of the wind and combination of all of the plurality of parameters and measurement thereof before shipment results in a heavy workload. Therefore, as a value used to correct the transport distance of the medium P, only a predetermined number of items of set data are measured and stored in the storage unit 52. The set data is formed through combination of the correction amount ΔPF2 and the first gap length Lpg which is a reference in a case of the thickness LP0 (hereinafter, also referred to as "reference thickness LP0") of the medium P, which is a reference in a part of the PLG level number (that is, first gap length Lpg) which is a preset reference.

Also, at the time of the printing, the PLG level number, which is applied to the current printing, is obtained, two items of set data formed through combination of the correction amount ΔPF and two first gap lengths Lpg with a value of the first gap length Lpg, which corresponds to the PLG level number, interposed, interpolation is performed using the selected two items of set data, and the correction amount ΔPF2 corresponding to a current PLG level number is calculated. To be more exact, a difference dx(=Lpg−X1−(LP−LP0), on the basis of respective items of information of the first gap length Lpg which is applied to the current printing, the first gap length Lpg (for example, X1 (refer to FIG. 14)) which is the reference of one item of set data of the selected two items, the thickness LP of the medium P, and the reference thickness LP0. A difference dy of the correction amount is obtained based on the difference dx and the function f(x). The difference dy of the correction amount is added to a reference correction amount Y1 of the one item of set data, and thereby the correction amount ΔPF2 (Y1+dy) corresponding to the current second gap length x1 is obtained.

In the present embodiment, without obtaining the second gap length x, the correction amount ΔPF2 corresponding to the second gap length x is acquired on the basis of the information of the PLG level number, the thickness LP of the medium P, and the reference thickness LP0, as parameters for control of the printing apparatus 11, and correction table data TD3 containing the set data corresponding to the PLG level number which is a part of the reference. Further, in the present example, a linear function is used, in which a graph line, which is shown in a curved line shape representing a relationship between the second gap length x and a shift distance of the landing position of the ink droplet in the transport direction F due to the influence of the wind, approximates to a straight line or a polygonal line. Also, as a calculation expression for obtaining the correction amount ΔPF2 corresponding to the second gap length x, a plurality of linear functions (y=f(x)=ax+b) is used (refer to FIG. 15).

Also, the printing unit 14 prints an image or the like on the medium P based on control by the computer 50 described above. As this type of printing method, there is printing technique referred to as band printing (hereinafter, "normal band printing") in which an image is printed by an amount corresponding to a length of a nozzle row of the nozzles 34N (refer to FIG. 7) in the print head 34 with the carriage 33 moving (scanning) once, subsequently, the medium P is transported in the transport direction F by an amount corresponding to the length of the nozzle row, then, the printing of the image in the same way and the transport of the medium P are repeatedly performed. In the printing apparatus 11 of the present embodiment, in a case where instruction information of the normal band printing is contained in the print information input from the operation unit 18 or the print information input from the PC 53, the control unit 60 controls the transport unit 13 and the printing unit 14 so as to perform the normal band printing.

Figure 4:
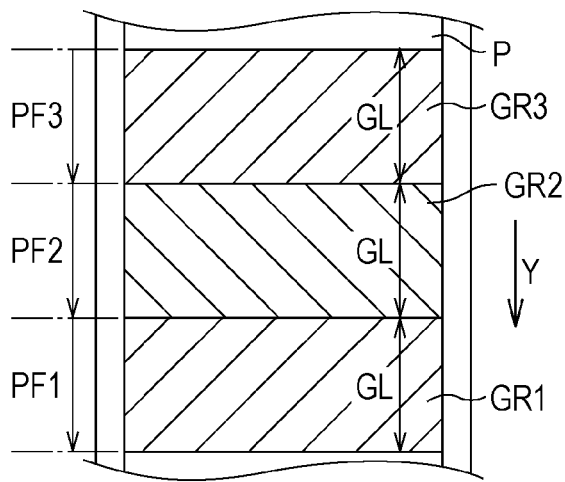
FIG. 4 is a schematic plan view of the medium on which printing is performed in a normal band printing method.

As illustrated in FIG. 4, in the normal band printing, after the transport of the medium P by a transport distance PF1 for the first time, a first-time image GR1 of an image length GL corresponding to the length of the nozzle row is printed on the medium P. Also, then, after the medium transport by a transport distance PF2 for the second time, a second-time image GR2 of the same image length GL as the first-time image GR1 is printed on the medium P. Also, then, after the medium transport by a transport distance PF3 for the third time, a third-time image GR3 of the same image length GL as the first-time image GR1 and the second-time image GR2 is printed on the medium P.

Also, in the case, when the transport distance PF1 for the first time, the transport distance PF2 for the second time, and the transport distance PF3 for the third time are the same, as illustrated in FIG. 4, the first-time image GR1, the second-time image GR2, and the third-time image GR3 are not printed with a gap between the adjacent images in the transport direction F or with a partial overlap. Incidentally, when there is a difference in the transport distance for each scanning in the normal band printing, the adjacent images are printed with a gap between both images and with a partial overlap.

Figure 5:
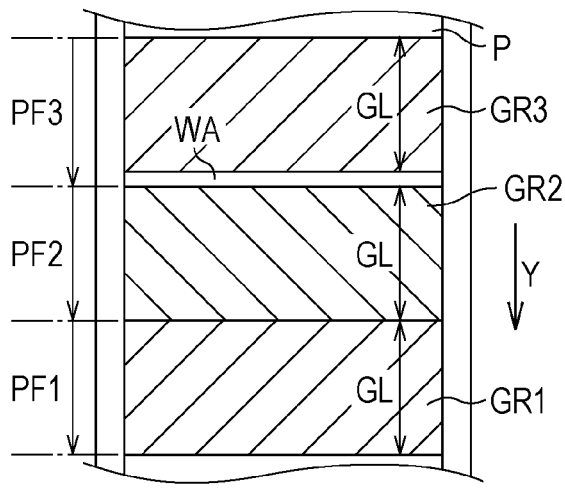
FIG. 5 is a schematic plan view illustrating an example in which white banding appears on a printing result printed in the normal band printing method.

In other words, as illustrated in FIG. 5, in the normal band printing, in a case where the transport distance PF1 for the first time is the same as the transport distance PF2 for the second time, but the transport distance PF3 for the third time is greater than the transport distances PF1 and PF2, a white banding region WA, which turns white with a gap formed between the second-time image GR2 and the third-time image GR3, is formed.

In addition, as illustrated in FIG. 6, in the normal band printing, in a case where the transport distance PF1 for the first time is the same as the transport distance PF2 for the second time, but the transport distance PF3 for the third time is smaller than the transport distances PF1 and PF2, a black banding region KA in which the second-time image GR2 and the third-time image GR3 partially overlap and a black band shape is printed.

Figure 7:
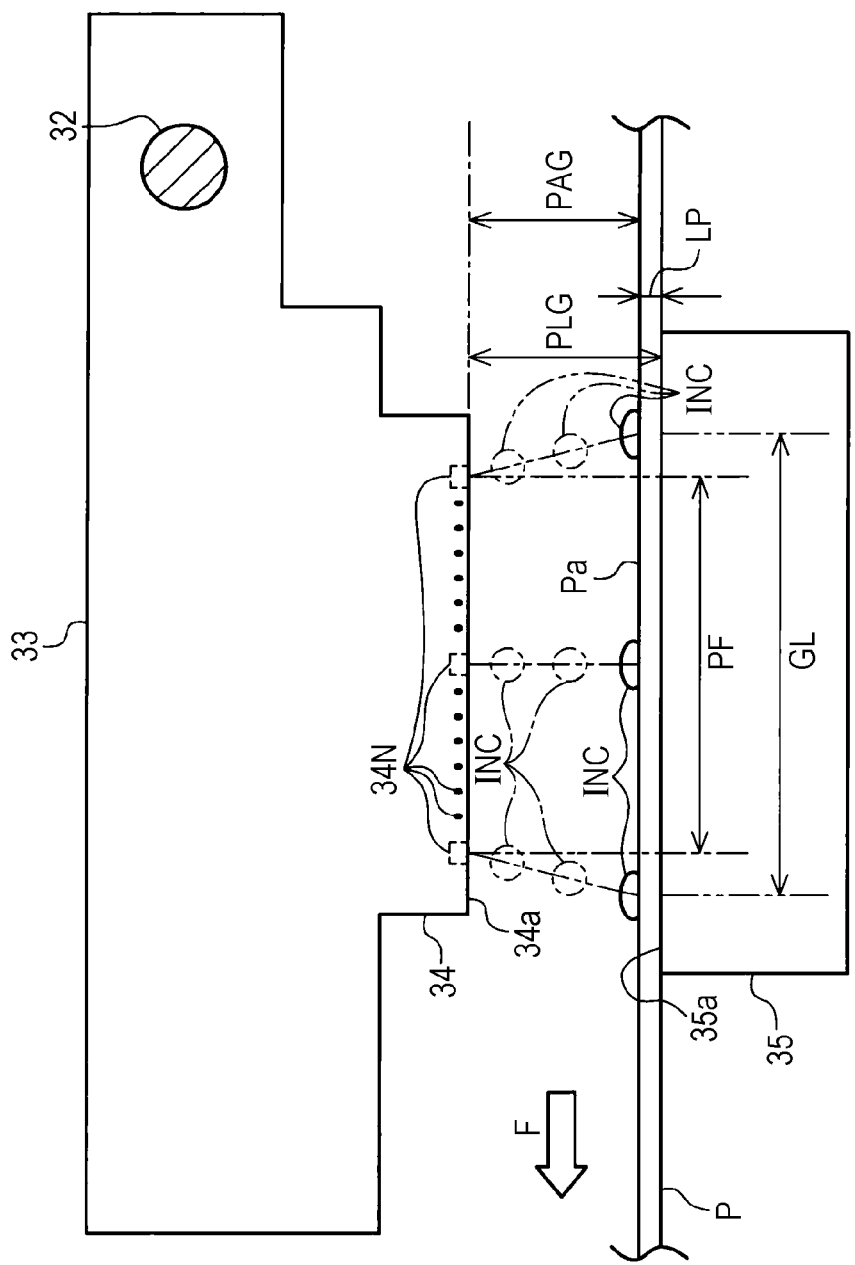
FIG. 7 is a schematic front view illustrating an influence of wind on an ink droplet in a case where a space between a print head and the medium is relatively narrow.

Incidentally, for example, as illustrated in FIG. 7, in the normal band printing, the medium P is intermittently transported in the transport direction F (in a white arrow direction in FIG. 7) by the transport distance PF corresponding to the length of the nozzle row formed to have multiple nozzles 34N in the nozzle formed surface 34a; however, the transport distance PF at that time is not equal to the image length GL of the image formed on the medium P. For example, due to an influence of wind generated when the carriage 33 and the print head 34 moves in a direction (direction orthogonal to the paper surface in FIG. 7) intersecting with the transport direction F of the medium P, a landing position of an ink INC discharged from the print head 34 is shifted in the transport direction F of the medium P, and the image length GL of the image formed on the medium P is greater than the transport distance PF. In addition, in a process of movement of the print head 34, an air current flows in a gap between kinds of ink droplet curtains formed of the ink droplets discharged from the nozzles 34N adjacent between the nozzle rows in the print head 34, in which the ink droplets are spread outward in a direction parallel to the transport direction F. In the case, the respective landing position of the ink INC is shifted so as to be wide in a direction parallel to the transport direction F of the medium P and the image length GL of the image formed on the medium P is greater than the transport distance PF.

Figure 8:
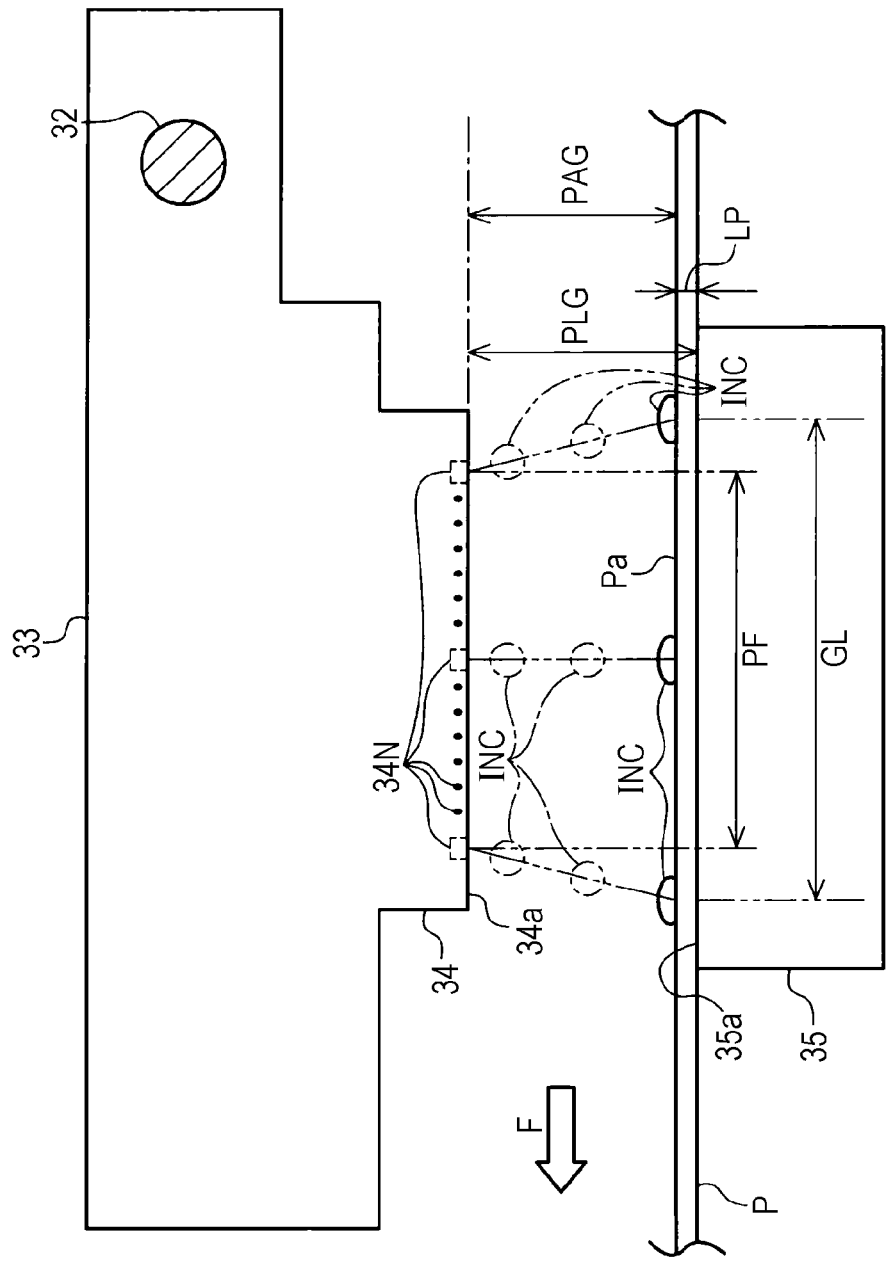
FIG. 8 is a schematic front view illustrating the influence of wind on an ink droplet in a case where the space between the print head and the medium is relatively wide.

In addition, as illustrated in FIG. 8, a difference between the transport distance PF and the image length GL, which is generated in the case, is changed depending on the size of the space PAG (for example, paper gap) between the surface Pa of the medium P supported on the support base 35 and the nozzle formed surface 34a of the print head 34. The size of the second space PAG is acquired by subtracting the thickness LP of the medium P from the size (second gap length) of the first space PLG. In the examples illustrated in FIGS. 7 and 8, since the first space PLG and the second space PAG in the case in FIG. 8 are greater than those in the case in FIG. 7, a difference between the transport distance PF and the image length GL is also greater in the case in FIG. 8 than that in the case in the FIG. 7.

Therefore, in the present embodiment, the transport distance PF is corrected according to the image length GL and, thus, although the landing position of the ink droplet is shifted in the transport direction F due to the influence of the wind, it is possible to reduce a relative positional shift in the transport direction F between a previous printing result and the current printing result with the transport interposed therebetween. As a result, bending due to an overlap or a gap between the previous printing result and the current printing result is reduced. Further, as illustrated in FIGS. 7 and 8, in the normal band printing method, the transport distance PF is transported through large feeding so as to correspond to a total nozzle pitch length corresponding to an amount of a total number (for example, total nozzle number n-m (here, m is, for example, 2 to 10)) of the nozzles 34N used in discharge of the ink INC, of the total nozzles 34N arranged at regular nozzle pitches in the transport direction F, or an amount of a number approximate to the total number thereof. In the printing method in which the intermittent transport by this kind of large feeding is performed, in addition to the normal band printing, an abnormal band printing method (also referred to as a "micro-feeding printing method").

The normal band printing is a printing method in which the intermittent transport of the medium P is performed through the large feeding by a predetermined distance equal to an accumulated length (total nozzle pitch length) of the total nozzle pitches of the total nozzles 34N, which are used, of the print head 34, and the printing is performed with the ink discharged from the print head 34 in between times of the intermittent transport. In comparison, the abnormal band printing method is a printing method in which intermittent transport (micro-feeding) of the medium P by a small distance equal to (0.5×J) times (here, J is an odd number) the nozzle pitch and the intermittent transport (large feeding) by a distance approximate to an accumulated length equal to or less than the accumulated length (total nozzle pitch length) of the total nozzle pitches are alternately performed, and the printing is performed with the ink discharged from the print head 34 in between times of the intermittent transport.

Here, in the case of the normal band printing and the abnormal band printing, the transport distance PF illustrated in FIGS. 7 and 8 is acquired by correcting a set transport distance PFo determined based on a printing mode and print data, using a correction amount $\Delta PF1$ of a transport system (PF=PFo+$\Delta PF1$). The correction amount $\Delta PF1$ of the transport system contains a correction amount $\Delta PF11$ due to an error in roller diameters of the transport roller pairs 39 and 40, and a correction amount $\Delta PF12$ obtained in consideration of a sliding amount between the medium P and the transport roller pairs 39 and 40. Also, in the present embodiment, the transport distance PF (=PFo+$\Delta PF1$), in which correction of the transport system is performed, is corrected using the correction amount $\Delta PF2$ which reduces the shift distance of the landing position of the ink droplet in the transport direction under the influence of the wind, and a corrected transport distance PFa (=PFo+$\Delta PF1$+$\Delta PF2$) is acquired.

Here, factors, by which the discharged ink droplet flow due to the wind and the landing position is shifted in the transport direction F, are as follows. In other words, the factors include a carriage speed Vcr, a width of a space in an apparatus, the size (second gap length) of the space PAG between the print head 34 and the surface Pa of the medium P, a discharge speed Vm of the ink droplet, an ink discharge ratio (printing duty) (%) per movement (scanning) once of the print head 34, an ink weight (or ink density), or the like.

The high the carriage speed Vcr, the greater the volume of air pushed aside by the carriage 33 per unit time and, thus, a stronger air current is generated. The narrower the width of the space in the apparatus, the faster the flow rate of the air current generated by air pushed aside when the carriage 33 moves and, thus, a stronger air current is generated. The greater the size (second gap length) of the space, the longer flight time, in which the ink droplet flows along with the air current, is taken for the ink droplet to land on the surface Pa of the medium P and, thus, the longer the time, the greater the shift distance of the landing position of the ink droplet in the transport direction F. The discharge speed Vm is an initial speed of the ink droplet discharged from the nozzles 34N and a speed during the flight of the ink droplet is gradually reduced as close to the landing position from the discharge position due to air resistance applied to the ink droplet during the flight. Therefore, the lower the ink droplet has the discharge speed Vm, the longer the flight time until landing on the surface Pa with a predetermined gap and, thus, the positional shift of the discharged ink droplet is increased in the transport direction F.

The ink discharge ratio (printing duty) (%) indicates a ratio of an actual total discharge amount to the maximum total discharge amount which is discharged using the total nozzles 34N, which are used, by the movement once of the print head 34, to the greatest extent. The ink discharge ratio becomes "100%" when, for example, ink droplets of large dots are discharged from the total nozzles 34N, and the ink discharge ratio becomes "50%" when, for example, ink droplets of large dots are discharged from half of the nozzles 34N.

Further, the ink discharge ratio is, for example, "50%" when the discharged ink droplets are medium-sized dots although the ink droplets are discharged from the total nozzles 34N, and, the ink discharge ratio is, for example, "20%" when the discharged ink droplets are small dots. When the ink droplets are together discharged from the total nozzles 34N, forces repelling each other are generated due to momentum of discharge flow, in the rows of the ink droplets, which are adjacent and belong to the adjacent nozzle rows. Therefore, a plurality of rows of ink droplets discharged from the print head for each nozzle row are spread outside from the center in the transport direction of the print head 34 in a fan shape due to the forces repelling each other (FIGS. 7 and 8). Here, the ink discharge ratio is acquired through analysis of the print data for one pass, in which the carriage 33 moves once in the scanning direction S, by the control unit 60 whenever the print data for one pass is acquired, and through calculation of the ratio (%) of the number of pixels of discharge to total pixels (total dots) for one pass by weighting pixel sizes (large, medium-sized, and small) of the pixels of the discharge.

The greater the ink weight (or ink density), the less the ink droplet receives the influence of the wind. Therefore, the shift distance of the landing position is reduced and the correction amount, with which the shift distance is corrected, may be reduced as the ink weight is increased. In other words, when the weight of the ink droplet is a first weight, the correction amount may be greater than a correction amount used when the weight of the ink droplet is a second weight that is heavier than the first weight. Here, modes, in which the weights of the ink droplets are different, include a color printing mode and a monochrome printing mode in which one print color is defined, and other examples of the modes include a standard printing mode and a high-definition printing mode in which an ink droplet size (dot size) is defined. A mode of the latter, in which the print quality is defined, may have three levels of low quality, standard quality, and high definition. A black pigment or dye is contained in black ink used in the monochrome printing mode and, for example, pigments or dye of the respective colors C, M, and Y are contained in color ink used in the color printing mode. Therefore, the specific gravity and contents of the pigment or dye contained in the ink are different depending on whether the monochrome printing or the color printing is performed and, thus, the ink density is different. Also, the ink droplet size is the same, the higher the ink density, the heavier the ink weight. Therefore, the ink droplet is unlikely to receive the influence of the wind and the correction amount is reduced.

In addition, in the present embodiment, the print head 34 can discharge ink droplets with different sizes, from the nozzles 34N. In the present example, for example, the ink droplet can be discharged so as to have three types of sizes of the large size, the medium size, and the small size. In a regular printing mode, the ink droplets are discharged so as to have two types of large sizes of the large size and the medium size. In a high quality printing mode, the ink droplets are discharged so as to have broadly two types of small sizes of the medium size and the small size. Here, when the specific gravity of the ink is constant, an average weight of ink droplets, which has a relatively large average size, is also relatively heavy in the regular printing mode. In comparison, in the high quality printing mode, an average size of ink droplets is relatively small and, thus, the average weight of the ink droplets is also relatively lightweight. Therefore, the higher the print quality in which the average size of ink droplets is smaller (more lightweight, the greater the correction amount.

Next, a method of selecting the first space PLG will be described. Here, the computer 50 in the printing apparatus 11 combines a medium type (for example, paper type) contained in the print condition information input along with the print instruction and the medium size (for example, paper size), thereby acquiring information of one PLG level number and the thickness of the medium P with reference to the PLG table data TD1 illustrated in FIG. 3. Further, the control unit 60 corrects the selected PLG level number, according to the combination of the printing mode (standard/high definition) and differentiation information of single-side printing/duplex printing, which are included in the print information.

Figures 12, 13:
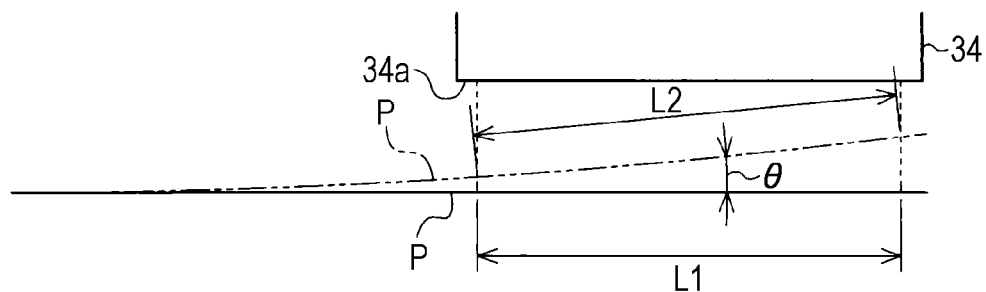
FIG. 12 is a schematic side view illustrating a state in which printing is performed on the medium positioned in the lower end region.
FIG. 13 is a diagram illustrating table data showing a relationship between the PLG level number and a gap length.

When one PLG level number is determined in this manner, the space acquiring unit 62 acquires a gap length Lpg (mm) according to the PLG level number, on the basis of the PLG level number, with reference to the table data TD2 illustrated in FIG. 13. Also, the space acquiring unit 62 acquires the thickness LP of the medium P and the first gap length Lpg as the size of the space PLG between the print head 34 and a support surface 35a, and calculates a difference between both the thickness and the first gap length, as necessary, thereby acquiring the second gap length x (=Lpg−LP) as a gap length of the space PAG (for example, paper gap) between the print head 34 and the surface Pa of the medium P.

For example, in the printing mode, a PLG level number greater in the gap length is selected in the high definition printing mode than that selected in the standard printing mode. A relatively greater amount of the ink lands per unit area on the medium P in the high definition printing mode and a PLG level number wider in gap is selected in the high definition printing mode than that selected in the standard printing mode such that the print head 34 avoids friction even on the medium P swelling by the ink absorbed in the medium P.

In addition, in the printing surface designating information of the duplex printing/single-side printing, a PLG level number wider in gap is selected in the duplex printing than that selected in the single-side printing. This is because the print head 34 needs to avoid the friction against the medium P in the duplex printing, in a state in which the medium P having the surface (single side), on which the printing is performed, absorbs the ink and swells, thereby being respectively likely to curl. Therefore, in the duplex printing, at least at the time of back surface printing, a PLG level number, with which a gap length wider than the gap length at the time of the single-side printing is obtained, is selected. In the present example, at the time of the duplex printing, the same PLG level number is selected without distinguishing between the surface and the back surface without exception, and the PLG level number is greater than the PLG level number at the time of the single-side printing. Further, in the duplex printing, a configuration may be employed, in which the same PLG level number as that in the single-side printing is selected in the surface printing and the PLG level number of the gap length greater than that in the single-side printing is selected in the back surface printing.

In addition, in the printing apparatus 11, a user can operation the operation unit 18 and select validity/invalidity of a friction preventing function. When the computer 50 receives an input signal indicating the validity of the friction preventing function from the operation unit 18, a PLG level number, with which a gap length greater than the gap length in a case of the invalidity of the function is obtained, is selected. In this manner, in the present example, the PLG level number determined with reference to the PLG table data TD1 illustrated in FIG. 3, on the basis of the medium information, is converted into a PLG level number with which a greater gap length is obtained at the time of duplex printing and the validity of the friction preventing function, on the basis of the differentiation information of the single-side printing/duplex printing and information of validity/invalidity of the friction preventing function.

Next, three types of regions, in which the medium P is positioned during the printing, will be described with reference to FIGS. 9 to 12. In the transport process, the medium P passes three types of transport positions of an upper end region illustrated in FIG. 9, in which the leading end (upper end) of the medium P in the transport direction is positioned between the transport roller pairs 39 and 40, a central region illustrated in FIG. 10, in which the medium P is supported at two positions by the transport roller pairs 39 and 40, and a lower end region illustrated in FIG. 11, in which the trailing end (lower end) of the medium P in the transport direction is positioned between the transport roller pairs 39 and 40, in this order.

Figure 9:
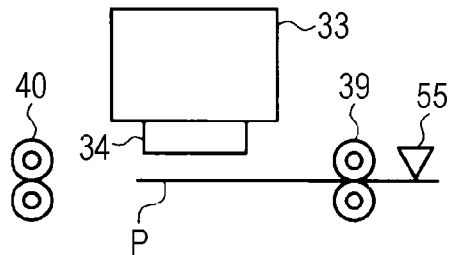
FIG. 9 is a schematic side view illustrating a state in which the medium is positioned in an upper end region during printing.
Figure 10:
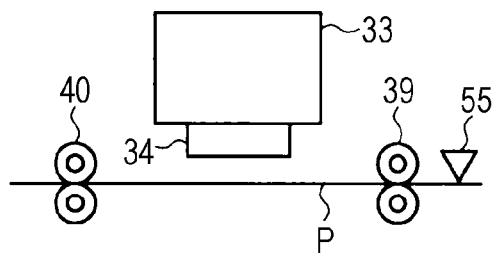
FIG. 10 is a schematic side view illustrating a state in which the medium is positioned in a central region during printing.

As illustrated in FIG. 9, when the medium P is positioned in the upper end region, the upper end portion of the medium positioned between the transport roller pairs 39 and 40 is in a state of being supported only by the transport roller pair 39 on the upstream side and the upper end portion extends along the support surface 35a of the support base 35 with the medium P stretched. In comparison, as illustrated in FIG. 10, when the medium P is positioned in the central region, the central portion of the medium P is supported (pinched) at two positions on both sides by the transport roller pairs 39 and 40 and, thus, the medium P is supported along the support surface 35a of the support base 35 without floating of a portion of a printing region.

Figure 11:
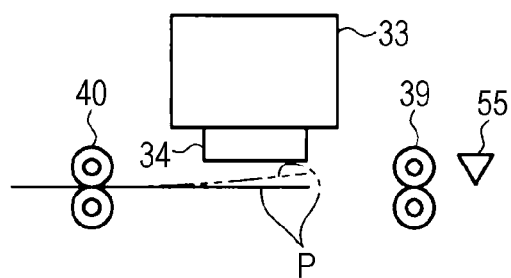
FIG. 11 is a schematic side view illustrating a state in which the medium is positioned in a lower end region during printing.

In addition, as illustrated in FIG. 11, when the medium P is positioned in the lower end region, the lower end portion of the medium P positioned between the transport roller pairs 39 and 40 is in a state of being supported only by the transport roller pair 40 on the downstream side. At that time, a portion of the medium, on which the printing is finished in advance, on the downstream side in the transport direction from the lower end portion of the medium P, is likely to curl with the swelling by the absorption of the ink and the lower end portion is likely to float upward from the support surface 35a.

As illustrated in FIG. 12, when the lower end portion of the medium P floats upward in inclination, for example, at an angle θ, a width L2 in an ink landing range, which is obtained when the medium P floats upward as shown by a two-dot chain line, is longer than a width L1 of an ink landing range in the transport direction F, which is obtained when the medium P does not float as shown by a solid line. Therefore, in the present embodiment, in a case where the upper end region and the central region are combined to form a normal region, the correction amount of the transport distance, which is used when the medium P is positioned in the normal region, is greater than the correction amount of the transport distance, which is used when the medium is positioned in the lower end region.

Here, the control unit 60 counts a number of pulses of a pulse signal input from the encoder 54 with the position of the medium P as a reference when the medium sensor 55 detects the leading end of the medium P, thereby controlling the transport position of the medium P based on the counted value. Also, the determination unit 63 determines that the medium P is positioned in the normal region or in the lower end region, by comparing a first range representing a range between the transport position of the medium P, which is controlled by the control unit 60, and the transport position when the medium P is positioned in the normal region, to a second range representing a range of the transport position when the medium P is positioned in the lower end region.

In the present embodiment, since the white banding region WA illustrated in FIG. 5 or the black banding region KA illustrated in FIG. 6 are decreased or disappear, the transport distance PF of the medium P is corrected according to the second gap length x determined by the thickness LP of the medium P and the first gap length Lpg according to the PLG level number at the time of the printing. In the storage unit 52, respective items of table data TD1 to TD3 illustrated in FIG. 3, FIG. 13, and FIG. 14, which are used when the computer 50 corrects the transport distance at the time of the printing.

First, the table data TD2 illustrated in FIG. 13 is a table showing a relationship between the plurality of PLG level numbers and the gap lengths Lpg. As an example, a gap length Lpg is shown for each of total seven levels of PLG1 to PLG7 of the PLG level numbers. Further, the unit of the gap length Lpg is [0.01 mm]. For example, gap length "130" of PLG1 means that a space between the support surface 35a of the support base 35 and the nozzle formed surface 34a of the print head 34 is "130"×[0.01 mm]=1.3 mm.

Figure 14:
FIG. 14 is a diagram illustrating a correction table which is referred to when a correction amount calculation expression is selected depending on various modes and the PLG level numbers.

Meanwhile, the correction table data TD3 illustrated in FIG. 14 is table data in which various items of data, with which a coefficient and a constant of a calculation expression used when a correction amount is calculated for each of the print color mode, a transport region, and the PLG level number, are determined, are set. In the correction table data TD3, a slope calculating set value is set for each print color mode, each transport region, each print speed mode (carriage speed Vcr), and each PLG level number, and the slope calculating set value determines a slope of a straight line (that is, coefficient in a calculation expression) representing, by a graph (refer to FIG. 15), a calculation expression of a linear function used when the correction amount ΔPF2 is calculated according to the gap length x, is determined by the slope calculating set value. The print color mode is divided into a monochrome printing mode and the color printing mode. In addition, the transport region is divided into two of the normal region and the lower end region. The print speed mode is divided into the high speed and the low speed. Further, the PLG level numbers are three ranges of PLG1 to PLG3, PLG4 and PLG5, and PLG6 and PLG7.

Figure 15:
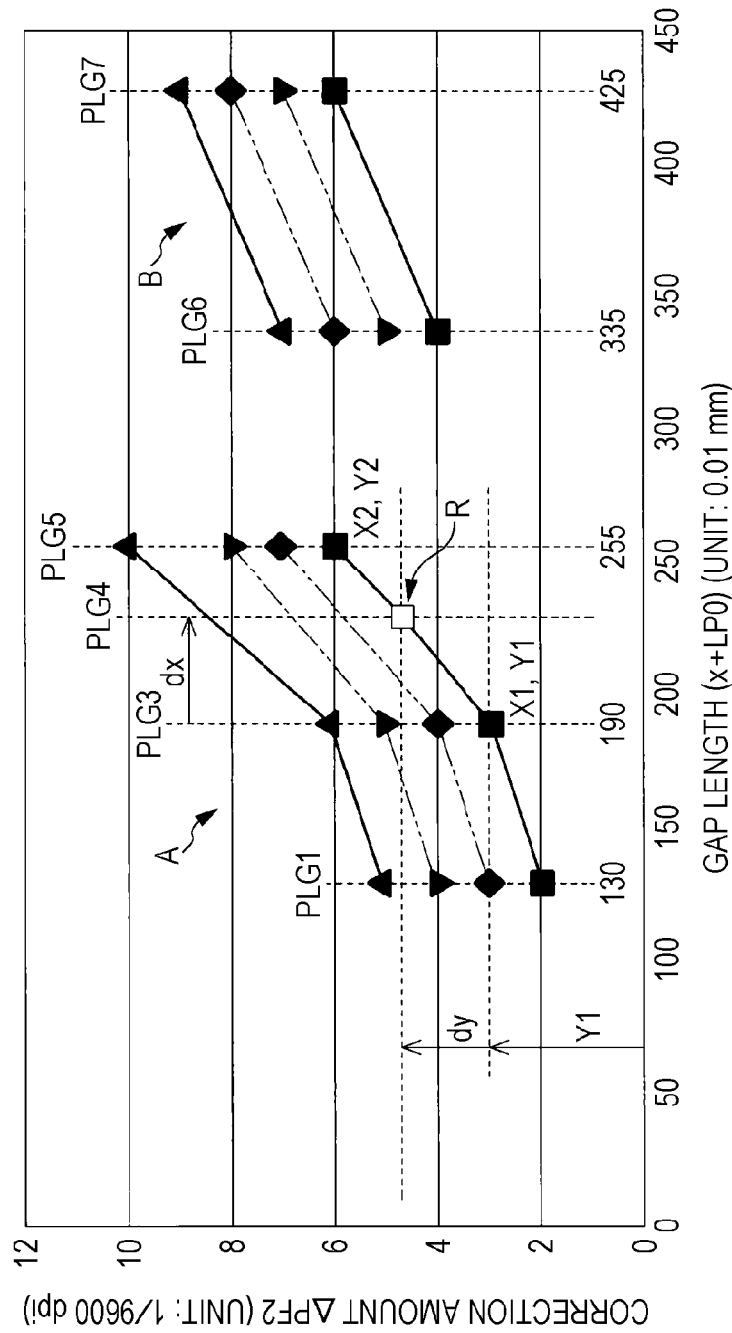
FIG. 15 is a graph illustrating a relationship between a gap length and a correction amount.

In the graph of the linear function representing the calculation expression illustrated in FIG. 15, the X axis indicates the gap length x (here, gap length (x+LP0) in the example in FIG. 15) and the Y axis indicates the correction amount ΔPF2. Also, the slope calculating set values (Y1, Y2, X1, and X2) illustrated in FIG. 14 represent coordinates (X1, Y1) and (X2, Y2) of two points, which are reference points on the straight line defining the slope of the straight line (FIG. 15) of the linear function. Further, PLG1 to PLG5 are used in a high-speed print mode which is set when the normal band printing and the abnormal band printing are performed on a first medium such as regular paper or photographic paper, which is relatively thin. Meanwhile, PLG6 and PLG7 are used in a low-speed print mode which is set when the normal band printing and the abnormal band printing are performed on a second medium such as an envelope, which is relatively thick.

Further, hereinafter, the normal band printing and the abnormal band printing are referred to as "printing corresponding to band printing" and are collectively and simply called "band printing".

For example, the PLG level number is PLG4 in the case where the printing mode is the monochrome printing, which means that the gap length x is a value in a range of "190 (X1)" to "255 (X2)", a correction amount is "H3BK (Y1)" in a case where the gap length x is "190 (X1)", and a correction amount is "H4BK (Y2)" in a case where the gap length x is "255 (X2)". Further, before shipment of the printing apparatus 11, the respective parameters (carriage speed, print color, and transport region) are changed by using regular paper having a reference thickness LP0 in the PLG level number as a reference, and a set value of the correction table data TD3 is obtained from a measurement result of a shift distance in the transport direction F based on a printing result of test printing performed in the band printing method. Also, the correction table data TD3 shows a relationship between the correction amounts ΔPF (Y1 and Y2) obtained using the measurement value of the shift distance in the printing result of the test printing and the gap lengths Lpg (X1 and X2) of the reference PLG level number, for each of the print color (mode) and transport region (normal/lower end).

In the correction table data TD3 illustrated in FIG. 14, the slope calculating set values (Y1, Y2, X1, and X2)=(H1BK, H3BK, 130, 190) corresponding to, for example, "1 to 3" of the PLG level number are used to identify a calculation expression when the PLG level number is "1 to 3".

Also, the slope calculating set values (Y1, Y2, X1, and X2) indicate the coordinates (X1, Y1) and (X2, Y2) of the two points at both ends of the straight line (FIG. 15) representing the linear function. The correction amount ΔPF corresponding to the PLG level number between two points at both ends is computed by interpolation using the coordinates of the two points at both ends.

The graph illustrated in FIG. 15 indicates a calculation expression of a linear function representing a relationship between the correction amount ΔPF2 and the gap length Lpg according to the PLG level number when the printing corresponding to the band printing is performed using the medium P of the reference thickness LP0 (for example, 0.11 mm). Hence, the X axis indicates the gap length Lpg when the gap length Lpg is applied to the medium having the reference thickness LP0, that is, the gap length (x+LP0). When the graph is shifted by an amount of the reference thickness LP0 (=0.11 mm) in a −X direction, the graph is converted into a graph of the linear function with the X axis indicating the gap length x. In addition, in the present example, the calculation expression is identified by the graph representing the relationship between the correction amount ΔPF2 and the gap length Lpg of the PLG level number, using a value of the measurement result before shipment of the printing apparatus 11; however, a calculation expression of the linear function representing the relationship between the gap length x and the correction amount ΔPF2 may be used.

In FIG. 15, a graphs A indicating a case where the PLG level number is PLG1 to PLG3, and PLG4 and PLG5 is a graph indicating the case of the high-speed print mode as a first moving speed at which the moving speed (carriage speed Vcr) of the carriage 33, in which the print head 34 is mounted, is relatively high. In comparison, a graphs B indicating a case where the PLG level number is PLG6 and PLG7 is a graph indicating the case of the low-speed print mode as a second moving speed at which the moving speed of the carriage 33, in which the print head 34 is mounted, is relatively lower than the first moving speed. The first moving speed in the high-speed print mode is, as an example, 360 cps at which the movement proceeds by 360 inches for one second. In addition, the second moving speed in the low-speed print mode is, as an example, 180 cps at which the movement proceeds by 180 inches for one second.

Reasons that the low-speed print mode is applied to the case where the PLG level numbers of the graphs B are PLG6 and PLG7 are as follows. The more the gap length is increased, the longer the flight time taken until the ink droplet discharged from the print head 34 lands on the surface Pa of the medium P, and the longer the flight time, the longer a distance in the transport direction F at which the ink droplet flows through the wind, that is, the longer the shift distance. Therefore, weakened wind by the relatively slow carriage speed Vcr enables the shift distance of the landing position of the ink droplet in the transport direction F to be reduced. As understood using the graphs A and the graphs B in FIG. 15, in general, the more the gap length x is increased, the more the correction amount ΔPF2 used in the correction of the transport distance due to the influence of the wind is increased. However, the low-speed print mode is applied, thereby making it possible to reduce the correction amount ΔPF2, compared to the case where the high-speed print mode is applied.

Figure 16:
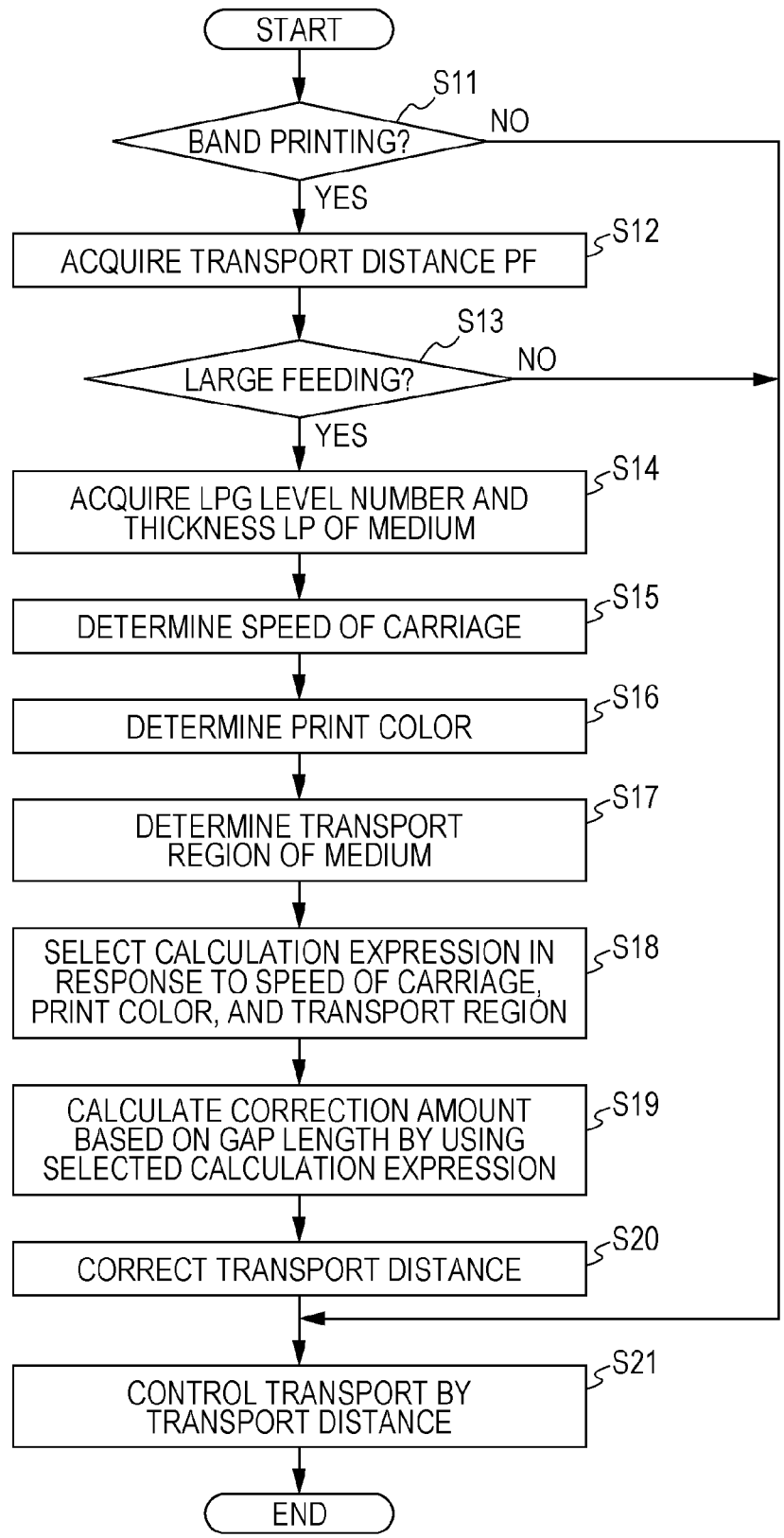
FIG. 16 is a flowchart showing a transport control process routine.
Figure 17:
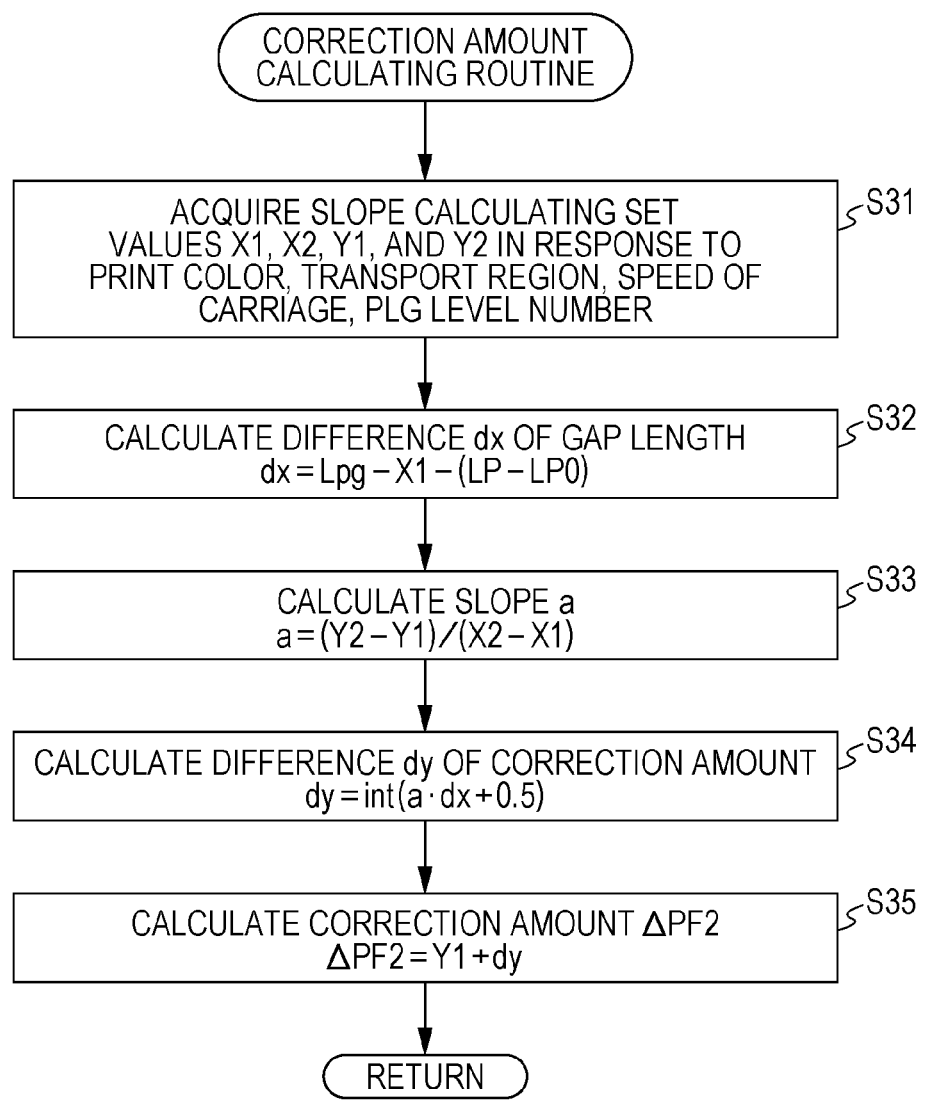
FIG. 17 is a flowchart showing a correction amount calculating routine.

Next, a transport control process, which is performed by executing a printing control program by the computer 50 in the printing apparatus 11 of the present embodiment, will be described with reference to FIGS. 16 and 17. When an instruction of the printing along with the print information is received from the operation unit 18 and the PC 53, the computer 50 of the printing apparatus 11, first, drives the transport system driving unit 56 and feeds the medium P set in a designated feeding source (for example, cassette 17) to the printing unit 14. The medium P is fed to a printing start position. Then, the computer 50 controls the driving of the carriage driving unit 57, thereby causing the print head 34 to perform movement (scanning) once in the scanning direction S and the computer controls the driving of the head driving unit 58 at the time of the movement such that an ink droplet is discharged from the print head 34, thereby causing the printing by an amount of one pass (amount of one row) to be performed by scanning for the first time. Also, next, the intermittent transport of the medium P is performed for the first time. The present routine is executed before the intermittent transport for the first time. Also, at the time of the printing of the printing apparatus 11, the computer 50 causes the printing by an amount of the movement once (amount of the one pass) of the print head 34 by controlling of the driving of the carriage driving unit 57 and the head driving unit 58, and the intermittent transport of the medium P by controlling of the driving of the transport system driving unit 56, to be alternately performed.

The present routine is executed by the computer 50 whenever the medium P is intermittently transported. Further, when an instruction of printing is received, the data acquiring unit 61 of the computer 50 causes print information input from the operation unit 18 and the PC 53 to be temporarily stored in the storage unit 52.

However, when the present routine starts, in Step S11, the computer 50 determines whether or not a method of the printing performed on the medium P is the band printing. In other words, the determination unit 63 of the computer 50 determines whether or not instruction information of the normal band printing and the abnormal band printing, which belong to the band printing, is contained in information input from the operation unit 18 and print information input from the PC 53. Also, in a case where it is determined that the instruction information of the band printing is not contained (NO in S11), the computer 50 ends the present routine.

In comparison, in a case where it is determined that the instruction information of the band printing is contained (YES in S11), the transport distance PF is acquired in the following Step S12. In other words, the control unit 60 of the computer 50 determines the transport distance PF on the basis of image information by an amount of the next scanning once, which is contained in the print information and a feeding regulation which is applied to the following pass according to the printing method at that time.

In the following Step S13, the computer 50 determines whether or not the intermittent transport of the medium P, which is currently performed, is a so-called large feeding in which the intermittent transport is performed at a transport distance approximate to the length of the nozzle row. In other words, in the case of the normal band printing, since the overall intermittent transport is fundamentally the large feeding, it is determined to be the "large feeding" in intermittent scanning every time. In addition, in the case of the abnormal band printing, since the micro-feeding and the large feeding are alternately performed, it is determined to be the "large feeding" only when the large feeding is performed. Also, in a case where it is determined that the transport mode is not the so-called large feeding (NO in S12), the computer 50 ends the present routine.

In comparison, in a case where it is determined that the intermittent transport for the current time is the large feeding (YES in S12), the computer 50 acquires the PLG level number and the thickness LP of the medium in the following Step S14. In other words, when the instruction of the printing is received, the space acquiring unit 62 acquires the medium information from the print information which is temporarily stored in the storage unit 52 by the data acquiring unit 61, and acquires the PLG level number and the thickness LP of the medium, with reference to the PLG table data TD1 illustrated in FIG. 3, on the basis of the medium types and the medium sizes contained in the medium information. The information of the PLG level number and the thickness LP is acquired according to set combination between the medium types (regular paper, glossy paper, an envelope, and the like) and the medium sizes (A4 size, A3 size, standard envelope size, and the like). Further, the space acquiring unit 62 acquires the second gap length x (=Lpg−LP) as the size of the second space PAG by subtracting the thickness LP of the medium P from the gap length Lpg (mm) as the size of the corresponding first space PLG obtained on the basis of the PLG level number with reference to the table data TD2 illustrated in FIG. 13.

In the following Step S15, the computer 50 determines the carriage speed Vcr. In the present example, the carriage speed Vcr (that is, the moving speed of the print head 34) is caused to vary depending on the medium types in the band printing. In other words, the high-speed print mode is applied to the case where the medium type is the first medium such as the regular paper or the photographic paper, which is respectively thin, and the low-speed print mode is applied to the case where the medium type is the second medium such as the envelope, which is respectively thick. The determination unit 63 acquires the print speed mode which is applied on the basis of the information of the medium types and acquires the carriage speed Vcr according to the acquired print speed mode. For example, in the case of the first medium such as the regular paper or the photographic paper, the carriage speed Vcr is determined as the first moving speed (for example, 360 cps) which is relatively high, and in the case of the second medium such as the envelope, the carriage speed Vcr is determined as the second moving speed (for example, 180 cps) lower than the first moving speed. Also, the computer 50 causes the determination result of whether the carriage speed Vcr is the high speed or the lower speed, to be temporarily stored in the storage unit 52 and then the process proceeds to the following Step S16.

In the following Step S16, the computer 50 determines a color used in the printing at the time of the current printing. In other words, the determination unit 63 determines which of the monochrome printing and the color printing the current printing mode belongs to. Further, this determination is performed based on the print information input from the operation unit 18 and the PC 53. Also, the computer 50 causes the determination result to be temporarily stored in the storage unit 52 and then the process proceeds to the following Step S17.

In the following Step S17, the computer 50 determines the transport region of the medium. In other words, the determination unit 63 determines whether the transport position of the medium P during the printing belongs to the normal region or to the lower end region. The determination unit 63 determines whether the medium P is positioned in the normal region or in the lower end region, by comparing the first range representing the range between the transport position of the medium P, which is controlled by the control unit 60, and the transport position when the medium P is positioned in the normal region, to the second range representing the range of the transport position when the medium P is positioned in the lower end region. Also, the computer 50 causes the determination result to be temporarily stored in the storage unit 52 and the process proceeds to the following Step S18.

In the following Step S18, the computer 50 selects a calculation expression according to the carriage speed, the print color, and the transport region. The correction amount acquiring unit 64 performs selection of the calculation expression. As illustrated in FIG. 15, when the carriage speed Vcr is the high-speed print mode as the high speed, the correction amount acquiring unit 64 selects a calculation expression in the graphs A and a calculation expression represented by one graph is selected according to a condition of the print color (monochrome/color) and a condition of the transport region (normal region/lower end region) to which the transport position of the medium P belongs.

In the following Step S19, the computer 50 performs calculation of the correction amount according to the gap length using the selected calculation expression. In this process, the correction amount acquiring unit 64 calculates the correction amount $\Delta PF2$ according to the second gap length x based on a calculation expression f(x) which is represented by a function of the second gap length x. Specifically, the computer 50 executes a correction amount calculating routine illustrated in FIG. 17 and the calculation is performed. The details of the process of the correction amount calculating routine will be described below.

In the following Step S20, the computer 50 corrects the transport distance. In other words, the control unit 60 corrects the transport distance PF by the correction amount $\Delta PF2$ acquired by the correction amount acquiring unit 64. Further, in the present embodiment, the respective processes of Steps S14 to S20 correspond to an example of a correction step.

Also, in the following Step S21, the computer 50 transports the medium by the transport distance PF. In other words, the control unit 60 controls the driving of the transport system driving unit 56 and transports the medium P by the transport distance PF through the rotation of the transport roller pairs 39 and 40. The medium P is transported to the next printing position, through the intermittent transport. At that time, in a case where the transport distance is corrected in Step S20, the control unit 60 controls the driving of the transport system driving unit 56 and the medium P is transported by the corrected transport distance. Further, in the present embodiment, the process of Step S21 corresponds to an example of a control step.

Next, the correction amount calculating routine will be described with reference to FIG. 16. The correction amount acquiring unit 64 of the computer 50 executes the correction amount calculating routine. Further, before the routine starts, the space acquiring unit 62 determines the PLG level number and the thickness LP of the medium P which are to be applied to the current printing. In addition, the current print color mode (monochrome printing/color printing), the transport region to which the current transport position of the medium P belongs, the print speed mode (high speed/low speed) which defines the moving speed (carriage speed Vcr) of the print head 34, or the like is determined. The determined respective items of information are temporarily stored in the storage unit 52.

In Step S31, the slope calculating set values Y1, Y2, X1, and X2 are acquired according to the print color, the transport region, the carriage speed, or the PLG level number. In other words, the correction amount acquiring unit 64 reads, from the storage unit 52, the print color mode (monochrome/color) applied to the current printing, the transport region (normal/lower end), the print speed mode (high speed/low speed), and the PLG level number (PLG1 to 7) and the slope calculating set values Y1, Y2, X1, and X2 are acquired on the basis of the parameters with reference to the correction table data TD3 illustrated in FIG. 14.

In the following Step S32, difference dx of the gap length is computed. In other words, the correction amount acquiring unit 64 computes the difference dx using the following Expression (1) to be described below.

$$dx = Lpg - X1 - (Lp - Lp0) \quad (1)$$

Here, Lpg represents the gap length (mm) according to the PLG level number applied to the current printing, X1 indicates an X reference coordinate according to the current PLG level number, Lp is thickness (mm) of the medium P on which the printing is currently performed, Lp0 indicates a reference thickness (for example, 0.11 mm) of the medium P (for example, regular paper), which is used in the test printing, before shipment. The difference dx corresponds to a difference between the gap length x 0 (=X1-Lp0) in the case of using a PLG level number as the reference used in the test printing before shipment of the product, and the gap length x which is applied to the current printing.

In the following Step S33, a slope a is calculated. In other words, the correction amount acquiring unit 64 calculates the slope a using the slope calculating set values (Y1, Y2, X1, and X2) and using Expression a=(Y2-Y1)/(X2-X1).

In Step S34, the difference dy of the correction amount is calculated. In other words, the correction amount acquiring unit 64 calculates the difference dy by using the following Expression (2).

$$dy = int(dx \cdot a + 0.5) \quad (2)$$

Here, an operator int( ) represents the greatest integer which does not exceed a value in ( ), and in the present example, the difference dy is calculated to be an integer by rounding off the value of dx·a.

In Step S35, the correction amount ΔPF2 is calculated. In other words, the correction amount acquiring unit 64 calculates the correction amount ΔPF2 by Expression ΔPF2=Y1+dy. When the correction amount ΔPF2 is calculated in this manner, the process proceeds to Step S20 in the FIG. 16. Further, the space acquiring unit 62 acquires the first gap length Lpg according to the PLG level number applied to the printing, and the second gap length x (=Lpg-LP) by calculating a difference of the thicknesses LP of the medium P and may calculate the correction amount ΔPF2 using a calculation expression represented by the linear function of the gap length x in which the graphs in FIG. 15 are shifted by the reference thickness LP0 in a -X axial direction.

Next, an operation of the printing apparatus 11 of the present embodiment will be described. Further, as a prerequisite, the correction of the transport distance is performed when the printing method of the current printing is the band printing. The band printing includes the intermittent transport in which the medium P is transported through large feeding in the transport direction F at a transport distance approximate to the length of the nozzle row of the print head 34.

However, when the print instruction is received, the computer 50 determines the print color mode (monochrome/color) applied to the current printing, the print speed mode (high speed/low speed), the medium types and the medium sizes of the medium P as a printing target, based on the print information or the like which is input from the PC 53.

Also, the computer 50 acquires the PLG level number and the thickness LP of the medium P on the basis of the medium types and the medium sizes with reference to the PLG table data TD1 illustrated in FIG. 3. Further, the PLG level number is appropriately changed to an appropriate level number, based on the differentiation information of the single-side printing and the duplex printing and information of validity/invalidity of the friction preventing function. When the PLG level number is determined, the control unit 60 causes the space adjustment driving unit 59, as necessary, and adjusts the selected PLG level number. As a result, the space PLG between the print head 34 and the support base 35 is adjusted to the first gap length Lpg according to the PLG level number.

Also, when the medium P is transported to the printing unit 14 from the printing route K2 by the transport unit 13 and the leading end of the medium P, which is transported, is detected by the medium sensor 55, for example, the number of pulse edges of the pulse from the encoder 54 starts to be counted and the transport position of the medium P during the printing is found based on the counted member. When the medium P reaches the printing start position, then, the printing of an amount of scanning once through which the carriage 33 moves in the scanning direction S and the ink droplets are discharged from the print head 34 and the intermittent transport, in which the medium P is transported to the next printing position, are alternately performed, thereby the printing on the medium P proceeds. At the time of the band printing including the normal band printing and the abnormal band printing, the transport distance is corrected according to the second gap length x, before the intermittent transport.

Assuming that the setting conditions of the current printing are set, in which the medium types of the medium P is the photographic paper, the medium size is 2L, the PLG level number is PLG4, the thickness LP of the medium is LP4 thicker than LP0, the print color mode is the monochrome printing, the transport region is normal, and the print speed mode (carriage speed) is high.

Then, the slope calculating set values (Y1, Y2, X1, and X2) corresponding to the setting operations are acquired with reference to the correction table data TD3 of the storage unit 52. In other words, the gap length Lpg (=230 [0.01 mm]) corresponding to PLG4 is read from the table data TD2 illustrated in FIG. 13, and the slope calculating set values (Y1=H3BK, Y2=H5BK, X1=190, and X2=255) corresponding to the case of PLG4 are read from the correction table data TD3 illustrated in FIG. 14, with monochrome, regular, and at a high speed.

Also, the second gap length x as the size of the space PAG between the surface Pa of the medium P and the print head 34 at the time of the current printing is calculated. Assuming that the current medium type of the medium P is the glossy paper, the thickness LP of the glossy paper is thicker than the reference thickness LP0 (=0.11 mm). Therefore, the difference dx obtained using Expression (1) described above is calculated by dx=Lpg−X1−(Lp−Lp0). As illustrated in a graph in FIG. 15, in the case of the PLG4 and the thickness LP4, the difference dx between a point of a coordinate (X1, Y1) and a point R in the X-axial direction are calculated as dx=55−LP3. In addition, the difference dy of the correction amount using the Expression (2) is calculated by dy=int (dx·a+0.5). Also, the difference dy of the correction amount is added to a reference correction amount Y1, and the correction amount ΔPF2 (=Y1+dy) is calculated. The transport distance PF of the medium P is corrected using the correction amount ΔPF2 appropriate to the PLG level number and the thickness LP of the medium P which are applied to the current printing.

Further, in the present embodiment, with an ink discharge ratio (%) (printing duty) calculated based on the print data for the amount of the previous scanning once, as a parameter, a contribution ratio of the parameter to the spreading of the ink discharged from the print head 34 in a direction parallel to the transport direction F is obtained and the correction amount ΔPF2 is adjusted depending on the contribution ratio. In addition, with an average size of the ink droplets, which is calculated based on the print data for the amount of the previous scanning once, or an average size of the ink droplets, which is acquired from the print quality (standard/high definition), as a parameter, a contribution ratio of the parameter to what extent that the ink discharged from the print head 34 is likely to flow in the direction parallel to the transport direction F due to the influence of the wind is obtained. Also, the correction amount ΔPF2 is adjusted depending on the contribution ratio.

For example, as illustrated in FIG. 7, when the carriage 33 moves in the scanning direction S, the wind is generated by pushing aside the air. In addition, in the process in which the print head 34 moves while the ink droplet is discharged from the nozzles 34N belonging to the adjacent nozzle rows, a kind of curtain is formed of the ink droplets and the print head moves in the scanning direction S. In the movement process of the print head 34, since the air current reaches a gap between the curtains of the respective ink droplets, the ink droplets are spread outside in the direction parallel to the transport direction F (refer to FIGS. 7 and 8)

The shift distance of the landing position of the ink droplet in the transport direction is greater in the case in FIG. 8 in which the second space PAG is relatively wider than that in the case in FIG. 7 in which the second space PAG is relatively narrow. In this case, the correction amount ΔPF2 added to the transport distance in the case in FIG. 7 is smaller than the correction amount ΔPF2 added to the transport distance in the case in FIG. 8. In addition, the correction amount ΔPF2 varies depending on whether the print color is monochrome or color. The density of the black ink at the time of the monochrome printing is different from the density of the color ink at the time of the color printing because of a difference in the pigment or the like. Also, the greater the ink density, the less the ink droplet is likely to flow and, thus, the less the correction amount is adjusted.

In addition, in the process in which printing is performed on one sheet of the medium, the transport position of the medium P passes through the upper end region (FIG. 9) in which the medium is supported only on the transport roller pair 39 on the upstream side of the transport roller pairs 39 and 40, the central region (FIG. 10) in which the medium P is supported at both sides of the transport roller pairs 39 and 40, and the lower end region (FIG. 11) in which the medium is supported by only on the transport roller pair 40 on the downstream side. Here, when the transport position of the medium P belongs to the lower end region, a portion of the medium P, on which the printing is finished in advance, is likely to curl with the swelling by the absorption of the ink and the lower end portion is likely to float upward from the support surface 35a. In this case, as illustrated in FIG. 12, when the lower end portion of the medium P floats upward in inclination, for example, at an angle θ, the width L2 in the ink landing range, which is obtained when the medium P floats upward as shown by the two-dot chain line, is longer than the width L1 of the ink landing range in the transport direction F, which is obtained when the medium P does not float as shown by a solid line. However, in the present embodiment, the correction amount of the transport distance used when the upper end region and the central region are combined to form the normal region is smaller than the correction amount of the transport distance used when the medium is positioned in the lower end region.

Therefore, it is possible to reduce the relative positional shift in the transport direction F of the printing result at the time of the previous scanning and the printing result at the time of the current scanning. As a result, it is possible to reduce or eliminate the white banding region WA illustrated in FIG. 5 and the black banding region KA illustrated in FIG. 6. Hence, as illustrated in FIG. 4, it is possible to perform the band printing with high quality, in which generation of the banding is suppressed.

According to the embodiment described above, it is possible to obtain a result as follows.

(1) When the ink is discharged from the print head 34 to the medium P transported to the printing unit 14 by the transport unit 13, the medium P is adjusted by the correction amount ΔPF2 corresponding to the size (second gap length x) of the space PAG between the surface Pa of the medium P and the print head 34 at the time of the printing. Therefore, since the medium P is transported by the transport distance suitable for the size of the space PAG at the time of the printing, for example, depending on the types of media P as printing targets, it is possible to reduce the positional shift of the landing position of the ink INC, which occurs in the transport direction F of the medium P.

(2) In the case where the moving speed of the print head 34 in the scanning direction S is relatively fast, wind becomes strong with the print head 34 moves and pushes aside the air, and the positional shift of the landing position of the ink INC from the print head 34 on the medium P in the transport direction is increased, the positional shift is reduced. In other words, the correction amount used when the moving speed is the first moving speed is set to be greater than the correction amount used when the moving speed is the second moving speed that is slower than the first moving speed. Also, in a case where the same transport distance is instructed, a first adjusted transport distance in the case of the first moving speed is adjusted to a value greater than a second adjusted transport distance in the case of the second moving speed. However, it is possible to transport the medium P by the adjusted transport distance in which the size is changed depending on a difference in the moving speed of the print head 34 and it is possible to more appropriately suppress the positional shift of the landing position of the ink INC, which occurs in the transport direction of the medium P even in a case where the moving speed of the print head 34 is different.

(3) In the case where the transport distance PF is corrected by the correction amount ΔPF2 in order to reduce the shift distance of the landing position of the ink droplet in the transport direction F due to the influence of the wind, the correction amount used when the size of the space PAG between the print head 34 and the medium P is a first value, is smaller than the correction amount used when a second value greater than the first value is used. Hence, regardless of the size of the space PAG between the print head 34 and the medium P, the banding can be appropriately reduced and it is possible to provide a printed matter having high quality.

(4) In the case where the transport distance PF is corrected by the correction amount ΔPF2 in order to reduce the shift distance of the landing position of the ink droplet in the transport direction F due to the influence of the wind, the correction amount used when the carriage speed Vcr as the moving speed of the print head 34 is the first moving speed is smaller than the correction amount used when the carriage speed Vcr is the second moving speed higher than the first moving speed. Hence, regardless of the carriage speed Vcr, it is possible to appropriately reduce the banding and to provide a printed matter having high quality.

(5) In the case where the transport distance PF is corrected by the correction amount ΔPF2 in order to reduce the shift distance of the landing position of the ink droplet in the transport direction F due to the influence of the wind, the correction amount, which is used when the print color mode is the monochrome printing mode, is different from the correction amount, which is used when the print color is the color printing mode. Hence, regardless of the monochrome or the color in the print color, it is possible to appropriately reduce the banding and to provide a printed matter having high quality.

(6) In the case where the transport distance PF is corrected by the correction amount ΔPF2 in order to reduce the shift distance of the landing position of the ink droplet in the transport direction F due to the influence of the wind, the correction amount used when the medium P is positioned in the normal region including the upper end region and the central region in the positional relationship with the transport roller pairs 39 and 40 is smaller than the correction amount used when the medium is positioned in the lower end region. Hence, regardless of the position of the medium P in any regions of the upper end region, the central region, and the lower end region, it is possible to appropriately reduce the banding and to provide a printed matter having high quality.

(7) In the case where the transport distance PF is corrected by the correction amount ΔPF2 in order to reduce the shift distance of the landing position of the ink droplet in the transport direction F due to the influence of the wind, a different correction amount ΔPF2 is applied depending on the ink discharge ratio (printing duty) (%) representing a ratio of the actual total discharge amount to the maximum total discharge amount that can be discharged from the total nozzles used per one pass of moving (scanning) once of the carriage 33. Particularly, when the ink discharge ratio (%) is the first ratio, the correction amount is smaller than the correction amount used when the second ratio, which is greater in the discharge ratio than the first ratio, is used. Hence, both even after the printing for one row is finished by a pass having high ink discharge ratio (%), and even after the printing for one row is finished by a pass having low ink discharge ratio (%), it is possible to transport the medium P by an appropriate corrected transport distance according to a degree of the spreading of the landing position of the ink droplets in the transport direction F according to the ink discharge ratios (%), respectively. Therefore, it is possible to appropriately reduce the banding and to provide a printed matter having high quality.

(8) In the case where the transport distance PF is corrected by the correction amount ΔPF2 in order to reduce the shift distance of the landing position of the ink droplet in the transport direction F due to the influence of the wind, the correction amount used when the average size of the ink droplets is the first average size is smaller than the correction amount used when the second average size smaller than the first average size is used. Hence, both when the average size of the ink droplets is the first average size which is relatively significant and when the second average relatively smaller is used, it is possible to appropriately reduce the banding and to provide a printed matter having high quality.

(9) In the case where the transport distance PF is corrected by the correction amount ΔPF2 in order to reduce the shift distance of the landing position of the ink droplet in the transport direction F due to the influence of the wind, the correction amount used when the weight (μg) of the ink droplet is the first weight is smaller than the correction amount used when the second weight, which is smaller than the first weight, is used. Hence, regardless of the size of the weight of the ink droplet, it is possible to appropriately reduce the banding and to provide a printed matter having high quality.

(10) In the case where the transport distance PF is corrected by the correction amount ΔPF2 in order to reduce the shift distance of the landing position of the ink droplet in the transport direction F due to the influence of the wind, the correction amount used when the density (g/ml) of the ink is a first density is smaller than the correction amount used when the second density, which is smaller than the first density, is used. Hence, regardless of the size of the weight of the ink droplet, it is possible to appropriately reduce the banding and to provide a printed matter having high quality.

(11) In the case where the printing is performed in the band printing methods, such as the normal band printing method and the abnormal band printing method, which include intermittent transport in which the medium P is transported through large feeding by a predetermined distance the same as the total nozzle pitch length, or a predetermined distance shorter than but approximate to the total nozzle pitch length, the transport distance is corrected by the correction amount ΔPF2. Hence, it is possible to reduce the relative positional shift in the transport direction F of the previous printing result in which the medium P is transported through large feeding in the band printing method and the large-fed printing result. As a result, it is possible to reduce the banding due to an overlap or a gap in the printing result (print dot group) before and after the medium P is transported through the large feeding. In this respect, it is possible to avoid degradation of the quality in the print image.

(12) The second gap length x (=Lpg−LP) is determined as the size of the space PAG between the print head 34 and the surface Pa of the medium P at the time of the printing, based on the medium information included in the print information input along with the image information. In other words, the PLG level number and the thickness LP of the medium P are acquired based on the medium types and the medium sizes contained in the medium information with reference to the PLG table data TD1 (FIG. 3) and acquires the second gap length x by subtracting the thickness LP from the first gap length Lpg (FIG. 13) corresponding to the PLG level number. It is possible to easily acquire the correction amount ΔPF2 based on the second gap length x determined in this manner.

(13) the first gap length Lpg corresponding to a space between the support base 35 and the print head 34 at the time of printing, and the correction table data TD3 including a plurality of items of set data formed by combining the first reference gap length Lpg and the correction amount which are stored in the storage unit 52, in advance, by sets is stored in the storage unit 52. Two items of set data, which contains two first gap lengths interposing a value of the first gap length Lpg acquired with reference to the PLG table data TD1 on the basis of the medium information, are acquired from the correction table data TD3. Also, interpolation is performed using two sets of acquired set data and the correction amount used in the case of the first gap length Lpg. In other words, an adjustment correction amount dy is obtained based on the Expression (2) using the difference dx obtained by the Expression (1), and the correction amount (Y1+dy) is acquired by adding the adjustment correction amount dy to the reference correction amount Y1. In this manner, it is possible to relatively simply acquire the correction amount according to the first gap length Lpg and the thickness LP of the medium P at the time of the printing, using two items of set data formed by combining the first gap length Lpg based on the medium information and two reference first gap lengths Lpg. Hence, the number of items of the reference set data stored in the storage unit 52 is reduced and it is possible to relatively simply acquire the correction amount according to the PLG level number (first gap length Lpg) other than the reference set data without directly calculating the second gap length x.

Further, the embodiment may be modified as follows.

Figure 18:
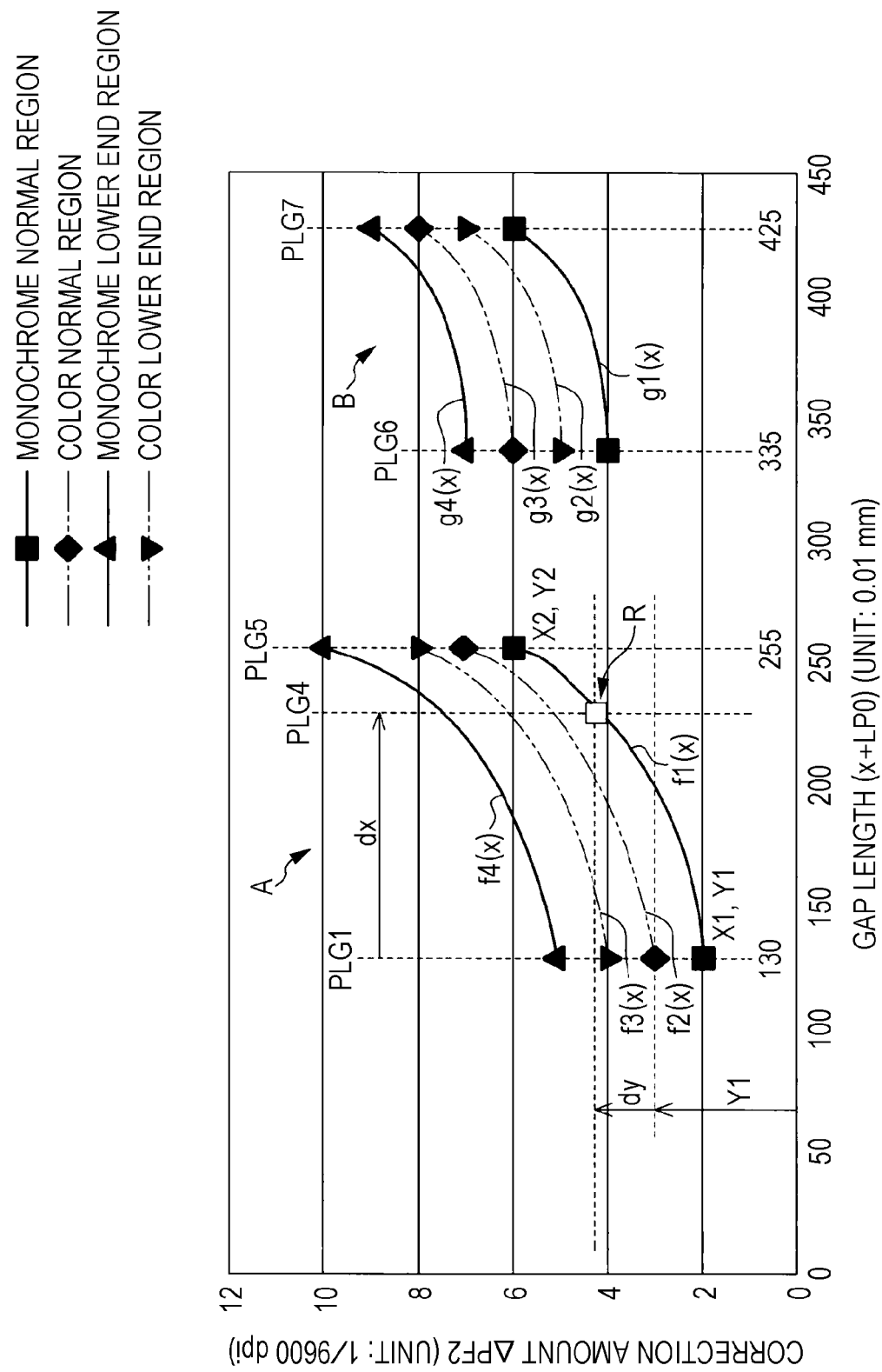
FIG. 18 is a graph illustrating a relationship between a gap length and a correction amount in a modification example.

The calculation expression is the linear function; however, a calculation expression represented by a curve function such as a quadratic function or a cubic function, in which the more a medium surface gap is increased, the more a rate of increase in the correction amount is gradually increased, may be used. For example, as illustrated in FIG. 18, curve functions f1(x) to f4(x) are used in the high-speed print mode and curve functions g1(x) to g4(x) are used in the low-speed print mode. In this configuration, since the function of the calculation expression is not an approximate expression, it is possible to acquire the still more accurate correction amount ΔPF2 and it is possible to appropriately perform correction by the transport distance. As a result, it is possible to further effectively decrease the banding.

Instead of the configuration in which the calculation expression representing a relationship between the gap length and the correction amount is used, a correction table (example of reference data) including combination of the gap lengths and the correction amounts overall may be stored in the storage unit 52. In this case, corresponding correction amount ΔPF2 is acquired with reference to the correction table based on the gap length which is applied at the time of the current printing. For example, it is possible to omit a calculation process using the calculation expression, in the acquisition of the correction amount using which the transport distance is corrected.

The print color (monochrome printing mode/color printing mode) may not be included in the parameters by which the correction amount is determined.

When the transport position of the medium P belongs to the upper end region during the printing, the correction amount may also be greater, compared to when the transport position belongs to the central region. In addition, a configuration may be employed, in which, whether the transport region, to which the transport position of the medium P belongs, is the normal region or the lower end region, is not set as a parameter to determine the correction amount.

In a case where the PLG level number (or gap length Lpg), which is applied at the time of the printing, is determined, there may be no need to refer to overall information, but may refer to at least one item of information of medium information (medium types and medium sizes), differentiation information of the single-side printing or the duplex printing, or validity/invalidity information of the friction preventing function. For example, the friction preventing function may not be provided. For example, the same PLG level number (gap length Lpg) may be set for the single-side printing and the duplex printing.

The correction of the transport distance is not limited to the correction through which the transport distance is increased by adding the correction amount due to the influence of the wind to the transport distance before the correction; however, the transport distance may be corrected to be decreased by subtracting the correction amount from the transport distance before the correction. For example, in a case where an ink landing area is relatively narrower than the nozzle area used in the transport direction F due to the influence of the wind, the correction amount is subtracted from the transport distance before the correction (or adding a minus correction amount), thereby making it possible to decrease the banding.

The thickness LP of the medium P is subtracted from the first gap length Lpg, and thereby the second gap length x as the size of the space PAG between the print head 34 and the medium P is acquired; however, the second gap length x may be obtained in another method. For example, the table data, in which the medium information (medium types and medium sizes) are associated with the second gap length x, may be stored in the storage unit 52 and the second gap length x may be acquired according to the medium information, from the medium information with reference to the table data. Further, the second gap length x may be acquired based on the information of the print information, other than the medium information. In addition, a distance from the print head to the surface of the medium is detected by the distance sensor, and thereby the second gap length x (paper gap) may be acquired.

Even in a case where the moving speed of the print head 34 in the scanning direction S is different from a threshold speed, PAG may be obtained without adjusting PLG.

In the embodiment described above, the liquid discharge apparatus is not limited to the printing apparatus 11 that discharges the ink, but may be a liquid discharge apparatus that discharges another liquid other than the ink. Similar to the type of liquid discharge apparatus, it is possible to reduce the positional shift of the landing position of a discharged liquid (liquid droplet) to the medium in the transport direction and it is possible to enhance accuracy of the landing position of the liquid droplet.

The correction of the transport distance by the correction amount $\Delta PF2$ due to the influence of the wind may be applied to only one of the normal band printing and the abnormal band printing which belong to the band printing. In addition, other than the normal band printing and the abnormal band printing, in a printing method, in which the large feeding (for example, a transport distance equal to or greater than $\frac{2}{3}$ of the nozzle row length) is performed, the transport distance may be corrected.

The applying of the correction of the transport distance is not limited to the printing method which includes the large feeding. For example, in a printing method in which the medium P is transported through the microfeeding by predetermined pitches such as $\frac{1}{2}$, $\frac{1}{3}$, or $\frac{1}{4}$ of the length of the nozzles used, in the transport direction, the correction of the transport distance by the correction amount $\Delta PF2$ may be applied. In the configuration, it is possible to reduce a shift in the transport direction F between the previous printing result and the current printing result before and after the microfeeding of the medium P.

As the parameter that determines the correction amount, it is possible to select an appropriate parameter as a cause by which a shift of the landing position of the ink droplet in the transport direction occurs due to the influence of the wind. For example, only the PLG level number (or the first gap length Lpg) or only the second gap length x may be selected as the parameter. For example, the transport distance may be corrected using the correction amount obtained on the basis of the first gap length Lpg. In this manner, since the thickness LP of the medium P is significantly small with respect to the size of the first gap length Lpg, the first gap length Lpg is configured as an example of the size of the space without considering the thickness LP of the medium P, it is possible to suppress degradation of the print quality due to the positional shift of the landing position of the ink, which occurs in the transport direction F of the medium.

In addition, as the parameter that determines the correction amount, only information in terms of the moving speed (or carriage speed Vcr) of the print head 34 at the time of the printing, or the moving speed of the print head, such as the print speed mode (high speed/low speed), may be used. Further, only the ink discharge ratio (%) (printing duty) may be selected as the parameter or only the print color may be used as the parameter. In addition, only the average size of the ink droplet for the scanning once of the print head 34 may be used as the parameter or only the average weight of the ink droplet or the average density thereof may be used as the parameter. In addition, of a plurality of parameters described above, the plurality of parameters such as two or three types may be combined and determine the correction amount.

Instead of the space adjustment driving unit 59, a configuration, in which a space adjusting mechanism which can adjust the PLG level number in a manual operation (or first gap length Lpg) is provided, may be employed. In this case, the space is detected by the sensor, or a user may operate the operation unit 18 and may input the space to the printing apparatus 11.

The configuration may be applied to a printing apparatus in which only one constant first gap length Lpg or second gap length x is used. In other words, the gap length Lpg or x may not be used as the parameter that determines the correction amount. In this case, the correction amount may be changed depending on the carriage speed. In other words, the correction amount becomes greater when the moving speed (that is, the carriage speed Vcr) of the print head 34 based on the mode information related to the print speed included in the printing information acquired by the data acquiring unit 61 (an example of speed information acquiring unit) is the second moving speed that is slower than the first moving speed, than that used when the moving speed is the first moving speed. According to the configuration, although the landing position of the ink droplet is shifted in the transport direction due to the influence of the wind, it is possible to reduce the positional shift of a relative position in the transport direction between the previous printing result and the current printing result and it is possible to suppress the degradation of the print quality.

The technical ideas understood from the embodiment and the modification examples described above are as follows.

(1) There is provided a printing apparatus including: a transport unit that transports a medium; a printing unit that discharges a liquid onto the medium from a print head while moving in a direction intersecting with a transport direction of the medium and performs printing; a speed information acquiring unit that acquires information of a moving speed of the print head while the printing is performed; and a control unit that corrects the transport distance of the medium using the correction amount obtained on the basis of the moving speed acquired by the speed information acquiring unit, thereby acquiring an adjustment transport distance, and controls the transport unit so as to cause the medium to be transported by the adjustment transport distance. According to the configuration, when the print head moves in a direction intersecting with the transport direction, the air in the printing apparatus is pushed aside, thereby causing an air current to be generated, and, although the liquid discharged from the print head flows in a course of landing on the medium and the landing position is shifted in the transport direction, transport of the medium is performed by the adjustment transport distance obtained through correction of the transport distance using the correction amount obtained on the basis of a shift distance thereof.

Hence, it is possible to perform the following print at an appropriate position with respect to the printing result obtained before the medium is transported.

The entire discovery of Japanese Patent Application No. 2015-033755, filed Feb. 24, 2015 and Japanese Patent Application No. 2015-136460, filed Jul. 7, 2015 are expressly incorporated by reference herein.

What is claimed is:
1. A printing apparatus comprising:
a transport unit that transports a medium;

a printing unit that discharges a liquid onto the medium from a print head while the print head moves in a direction intersecting with a transport direction of the medium and performs printing;

a corrector that corrects a transport distance of the medium using a correction amount obtained on the basis of the size of a space between a surface of the medium and the print head in the printing unit;

a storage unit that stores reference data in which first gap lengths, as sizes of the space between a support that supports the medium and the print head, and thicknesses of media are individually associated with respective items of medium information; and a control unit that controls the transport unit and causes the medium to be transported by the transport distance obtained after the correction, wherein the corrector includes:

a space acquiring unit that acquires the size of a space between a surface of the medium and the print head in the printing unit, and a correction amount acquiring unit that corrects the transport distance of the medium using the correction amount obtained on the basis of the size of the space, wherein the space acquiring unit acquires medium information, acquires the first gap length and the thickness of the medium corresponding to the medium information with reference to the reference data on the basis of the medium information, and acquires a second gap length as the size of the space between the surface of the medium and the print head by subtracting the thickness of the medium from the first gap length.

2. A printing apparatus comprising:

a transport unit that transports a medium;

a printing unit that discharges a liquid onto the medium from a print head while the print head moves in a direction intersecting with a transport direction of the medium and performs printing;

a corrector that corrects a transport distance of the medium using a correction amount obtained on the basis of the size of a space between a surface of the medium and the print head in the printing unit;

a control unit that controls the transport unit and causes the medium to be transported by the transport distance obtained after the correction; and a storage unit that stores first reference data, in which first gap lengths, as sizes of a space between a support that is able to support the medium and the print head, are individually associated with a plurality of respective items of medium information, and second reference data containing a plurality of sets of set data in which the first gap lengths are individually associated with the correction amounts, wherein the corrector acquires one first gap length according to the acquired medium information with reference to the first reference data on the basis of the acquired medium information, acquires, from the second reference data, two sets of set data containing two different first gap lengths having two values, between which a value of the first gap length is interposed, and correction amounts corresponding to the two different first gap lengths, and acquires the correction amount corresponding to the one first gap length by performing interpolation using the two sets of set data.

3. The printing apparatus according to claim 2, wherein the corrector corrects the transport distance using the correction amount when the control unit performs printing corresponding to band printing.

4. The printing apparatus according to claim 3, wherein the corrector performs correction in which the above correction amount is more increased when a moving speed of the print head is a first moving speed than when the print head moves at a second moving speed that is slower than the first moving speed.

5. The printing apparatus according to claim 4, wherein the corrector performs correction in which a correction amount, which is used when the size of the space is a first value, is smaller than a correction amount, which is used when the size is a second value, which indicates that the space is wider than that having the first value.

6. The printing apparatus according to claim 5, wherein the print head is able to discharge liquid droplets having different weights, and wherein the corrector performs correction in which a correction amount, which is used when a liquid droplet having a first weight is discharged, is smaller than a correction amount, which is used when a liquid droplet having a second weight that is less than the first weight is discharged.

7. The printing apparatus according to claim 6, wherein printing modes include a monochrome printing mode and a color printing mode, and wherein the corrector changes the correction amount depending on the monochrome printing mode and the color printing mode.

8. The printing apparatus according to claim 7, wherein the corrector performs correction in which, a correction amount, which is used when a liquid discharge amount ratio representing a ratio of an actual total discharge amount to the maximum total discharge amount, by which the print head is able to perform the discharge through moving once, is a first ratio, is smaller than a correction amount, which is used when the ratio is a second ratio that is greater than the first ratio.

* * * * *